United States Patent
Billiotte et al.

(10) Patent No.: US 7,644,005 B1
(45) Date of Patent: Jan. 5, 2010

(54) METHOD AND AUTOMATIC CONTROL FOR REGULATING A MULTIPLE-STAGE INDUSTRIAL PRODUCTION CONTROLLING RANDOM CHAINED STRESS, APPLICATION TO NOISE AND VALUE AT RISK CONTROL OF A CLEARING HOUSE

(76) Inventors: Jean-Marie Billiotte, c/o Multek, 112 Av. du Gl de Gaulle, BL 41, 93118 Rosny-Sous-Bois Cedex (FR); Ingmar Adlerberg, 44 rue de Montmorency, 75003 Paris (FR); Raphaël Douady, 2 rue d'Ulm, 75005 Paris (FR); Ivan Kovalenko, 7, boulevard deDixmude, 751017 Paris (FR); Philippe Durand, 19 avenue de Villiers, 75017 Paris (FR); Jean-François Casanova, 16 rue José Maria de Herédia, 75007 Paris (FR); Jean-Philippe Frignet, 48 B Avenue, Mozart (FR); Frédéric Basset, 29 Ennismore Gardens, SW7 1AJ London (GB)

( * ) Notice: Subject to any disclaimer, the term of this patent is extended or adjusted under 35 U.S.C. 154(b) by 0 days.

(21) Appl. No.: 10/149,960

(22) PCT Filed: Apr. 21, 2000

(86) PCT No.: PCT/FR00/01059
§ 371 (c)(1),
(2), (4) Date: Mar. 12, 2003

(87) PCT Pub. No.: WO00/65418
PCT Pub. Date: Nov. 2, 2000

(30) Foreign Application Priority Data

Apr. 21, 1999 (FR) .................................. 99 05074

(51) Int. Cl.
*G06Q 10/00* (2006.01)

(52) U.S. Cl. ........................................................ 705/7
(58) Field of Classification Search ..................... 705/7
See application file for complete search history.

(56) References Cited

U.S. PATENT DOCUMENTS 7,043,444 B2 * 5/2006 Ojha et al. ..................... 705/8
7,155,399 B2 * 12/2006 Andre et al. ................... 705/9
7,188,075 B1 * 3/2007 Smirnov ....................... 705/10

OTHER PUBLICATIONS

F. Debbasch, K. Mallick, and J. P. Rivet, "Relativistic Ornstein—Uhlenbeck Process" Journal of Statistical Physics, Springer Netherlands,ISSN 0022-4715 (Print) 1572-9613 (Online), Issue vol. 88, Nos. 3-4 / Aug. 1997.*
Crouhy et al., "Risk Management" McGraw Hill 2001, ISBN 0-07-135731-9, pp. 187-249.
Dowd, K., "Beyond Value at Risk" Wiley & Sons 1998, ISBN 0-471-97621-0, pp. 63-69, 99-115.
Fabozzi, F., "Investment Management, $2^{nd}$ Ed" Prentice Hall 1999, ISBN 0-13-889155-9, p. 69.
Hull et al., "Options, Futures and Other Derivatives, $4^{th}$ Ed." Prentice Hall 1999, ISBN 0-13-014819-9, Ch. 11.
Guill, G.,"Bankers Trust and the Birth of Modern Risk Management " The Wharton School, circa 1999, Financial Institutions Center, pp. 1-23.
Zumbach, G., "A gentle introduction to the RM 2006 methodology" Aug. 2006, pp. 1-13., RiskMetrics Group, New York, NY.
http://www.bloomberg.com/markets/index.html?Intro=intro%20markets Nov. 26, 2007.
http://today.reuters.com/investing/MarketsHome.aspx Nov. 26, 2007.
http://ids.csom.umn.edu/faculty/kauffman/course/8420/Proiects/Risk_Mgmt/index2.htm Nov. 26, 2007.

* cited by examiner

*Primary Examiner*—Jonathan G Sterrett
(74) *Attorney, Agent, or Firm*—Foley & Lardner LLP

(57) ABSTRACT

The invention concerns a probabilistic method and automatic control (3) for preventing and regulating an interruption of a multistage and multilink industrial production glow, to optimise said production flow while controlling industrial impact resulting from random chained stress, and applications to factory noise and value at risk of a clearing house. The invention consists in regulating production by means of a probabilistic automatic control (3) with action loop (5) and feedback loop (6). Industrially speaking, said regulating automatic control (3) can be electronically produced by means of a programmed and cabled computer. The action loop (5) of the automatism (3) consists of an inductive probabilistic simulator (11) evaluating the chaining of random stresses in the production chain leading to a probabilistic measurement of the industrial impact I(r) resulting, on the basis of the adjustable level of an industrial stock parameter (r). The method used in the action loop (5) of the automatic control (3), is of the type called "Value at Risk" or "VaR". The feedback loop (6) of the automatic control (3) adjusts in course of time (t) the industrial action parameter (r) to an extremal value, maintaining said estimator of VaR effect (p,T(r)) below its authorised nuisance level M. This is aimed at making the industrial production level F(r) extremal but nevertheless at a level compatible with the respect of regulatory or stock out conditions. The method and device of the invention can be advantageously used in numerous industries whether manufacturing, financial, agricultural where risks of pollution and other risks resulting from random chained stress need to be controlled.

8 Claims, 6 Drawing Sheets

US 7,644,005 B1

METHOD AND AUTOMATIC CONTROL FOR REGULATING A MULTIPLE-STAGE INDUSTRIAL PRODUCTION CONTROLLING RANDOM CHAINED STRESS, APPLICATION TO NOISE AND VALUE AT RISK CONTROL OF A CLEARING HOUSE

TECHNICAL FIELD OF THE INVENTION

The present invention concerns a process and a mechanism (automation) to regulate and/or prevent the stoppage of a flow F of a multi-stage and multi-linked industrial process of the following type:
- to optimise the production flow F(r) while acting on a parameter of industrial action (r).
- mastering an uncertain industrial impact I(r) resulting in an uncertain stress chain on the different stages of production
- this stress chain being itself the consequence of an uncertain environmental production variable X The invention is particularly applicable in the cases where one must:
- optimise the pair, (flow of product F(r) and the uncertain industrial impact I(r)).
- by regulating the industrial parameter (r), and
- while taking into account the regulatory criteria and the limits imposed by the risk of stoppage imposed by the impact variable I(r).

By the term "Industrial Production" (or "production") is understood, according to this invention, all human activity which has as its goal the production of an added-value product (production flow) that an be directly or indirectly expressed in terms of added value which might be itself associated with an industry that could be manufacturing, energy, agro-food or financial . . .

By "Production Flow" F(r) is understood according to the invention, all transfer of materials or measurable content arriving at the final stage $E_n$ and providing the chain of production activities of the sub-processes $S_{ij}$ at the different steps $E_i$ of the production cycle.

The invention applies to the domains of industry, manufacture and finance, where it is appropriate to estimate, in order to circumscribe it, an uncertain impact I(r), which can be—for manufacturing—pollution, or—for a financial process—risk of loss or failure, and which is connected with a production of a value-added good (manufactured or financial product). The searched-for global goal for which we aim is to optimise the production flow of the value-added good while limiting the uncertain negative impact of this production. This uncertain impact I(r) is normally found to grow with the production of the value-added good.

The invention is put to work specifically in the case of a multi-stage multi-linked configuration. The structure of this production of this production can be either tree-like, or, in the more general case, matrix-like.

DISCLOSURE OF THE INVENTION

The invention consists of the control of production according to a probabilistic automatic procedure with an action loop and a reaction loop. Industrially, this automatic control can be electronically implemented with the help of a computer that is programmed and networked to control the stages of the process according to the invention, such as will be described below. The outputs from the computer are transmitted through a system of activators or servomotors which control the industrial parameter (r) to set it to its optimal value.

According to the invention, the action loop of the automatic process consists of an inductive probabilistic evaluation simulator of the chain of uncertain stresses in the production chain resulting in a probabilistic measure of the resulting industrial impact I(r), which is a function of the "controlled" level of the industrial parameter (r). The method put to work by the invention, at the heart of the automatic action loop, is generally called "Value at Risk" or "VaR". The VaR method is actually used principally in financial applications, with a view to grasp the quantifiable risks of the market (value volatility of a portfolio of stock), and of the credit and liquidity risks of financial institutions.

The invention's action loop for the probabilistic automatic control of production measures the function of the possible values of the industrial action parameter (r), and the Value at Risk, VaR of the production flow F(r), this for a duration T and a probability level (p). That is, for, the action loop measures the estimate of the of the effect that is described as the value of VaR (p,T) (r), such that the impact I(r) imposed by the production during the time horizon T=[0,t] only exceeds VaR by the probability (p); this, while taking into account the uncertain variations of the sub-uncertainties $X_i$ which influence the production.

Within the invention's automatic probabilistic reaction loop for production control, the level of the industrial control parameter (r) is set during the time (t) to the external multi-variable $(r_{max})$ or $(r_{min})$, while maintaining the aforementioned effect estimator VaR (p,T) (r) on the right side of of its authorized impact level M. That is, in the general case, where the action parameter $r=(r_i, \ldots, r_h, \ldots, r_n)$, the authorized impact level $M=(M_1, \ldots, M_h, \ldots, M_n)$ and the reliability probabilities $(p)=(p_1, \ldots, p_h, \ldots, p_n)$ are multivariables, the (r) is picked at the extremes such that nevertheless for each index h:

$VaR_h (p_h,T) (r_{max}$ or $r_{min})<M_h$ (type 1—Minimising the induced effect), or $VaR_h (p_h,T) (r_{max}$ or $r_{min})>M_h$ (type 2—Maximising the induced effect)

This is with the goal of pushing the industrial production level F(r) to the limit while still being compatible with the aforementioned regulatory condition of controlling the impact $Prob[I_h(X,T) (r)<M_h]\geq p_h$ (type 1) or $Prob[I_h(X,T) (r)>M_h]\geq p_h$ (type 2). That is, for each index h, the induced effect $I_h$ stays less than (type 1) or larger than (type 2) the authorized level $M_h$ with a probable reliability of $p_h$.

STATE OF PRIOR ART AT THE APPLICATION OF THIS INVENTION

According to prior art, there are three classical techniques to estimate the distribution of the uncertain industrial impact I(r) by a VaR method. For the sake of simplification, we place it here in the realm of financial applications (the most frequent use of prior art), the measure of risk in a portfolio of financial investments, and specifically in a portfolio of stock (the global volatility of their value), tied to the uncertainties of the market. In effect, the applications of the VaR methods on industrial manufacture, while perfectly viable, are actually essentially confined to an academic level. In the realm of this financial application, the Value at Risk of a portfolio during a duration T and a probability level p is understood to be the amount, called VaR, such that the loss incurred in this portfolio during the time horizon T=[0,t] does surpass VaR only with a probability equal to (1−p). That is, formally,: Prob [portfolio loss>VaR]=1−p, this probability being calculated according to an assumed distribution of the external sub-uncertainties $X_i$ (volatility in the market) which influence the portfolio.

The first method for estimating the VaR is called the estimated variance/covariance matrix, initially developed by the JP Morgan company (See JP Morgan, RiskMetrics™—Technical documents, $4^{th}$ ed., Morgan Guaranty Trust Company New York, 1996). This method is practically not applicable, an/or very imprecise when applied to complex investment assets (the implicit volatility of options).

The second method for estimating the VaR, called historical analysis, was originally advocated by the Chase Manhattan Company, with the Charisma™ and Risk$™ (see CHASE MANHATTAN BANK, N.A., Value at Risk, 1996). This method rests on the hypothesis that the risk factors are stable. In addition to the fact that that it presupposes that the future has a statistical behaviour identical to the past—and more precisely, the recent past—it has a strong tendency to badly evaluate the frequency of catastrophic events. Further, the historical VaR method can not technically simulate the total failure of a stage in the risk process.

The third method for estimating the VaR, called "The Monto Carlo Simulation" was initially advocated by the Bankers Trust Company with its RAROC 2020™ system.

A general description of these three systems can be found at

"Value at Risk" by Esh, Kieffer and Lopez, appearing in the "éditions DeBoeck";

"Mastering Value at Risk" appearing in the Pitman Publishing series

"The Practice of Risk Management" by Litterman and Gimerlock, in the Euromoney Books series, New York, 1998;

"Value at Risk; the New Benchmark for controlling Market Risk" in the "éditions Professional, 1997".

The invention, in its automatic probabilistic action loop, measures the uncertain industrial impact I(r) resulting from the chained stresses in the production subsystems $S_{ij}$ in the different production steps, according to the third method, i.e. by Monte Carlo Simulation.

The systems to determine the final probabilistic impact (VaR) in a production system (especially financial) advocated by prior art:

apply to systems that are not multi-stage and/or not multi-linked, that is they are not applicable to the technical domain of this invention, and do not use the additional specifics of this invention when their application is mutli-stage or multi-linked, they do not use an inductive probabilistic model of chained calculations of stress at different stages of production, that is they do not use the characteristics of this invention If one refers to the domain of the risk matrix of financial portfolios and of the optimisation of activities in a clearing house (application of a potentially multi-stage or multi-linked type in the financial industry) where the uncertain values $X_i$ are composed of the variations of the stock values; where the impact I(r) is composed of the potential global loss of the clearing house; where the stresses $W_{ij}$ are composed successively: of the loss-of-customers suffered by members or local offices (step $E_{i-1}$), and then the loss of members (step $E_i$); and/or the the multivariable action parameter (r) is composed of the members' deposited guarantees $r_i$ to the clearing house:

a single-step or non-linked system studies the risk I of the global failure of the clearing house, while taking into account the risk of each counterparty (broker or member), at one step a system of a type using this invention is applicable to a multi-stage and multi-linked clearing house, that is taking into account several stages of cascading failures: the initial stage of customers or of a member, or of local offices, then the stage of members (brokers) themselves . . . .

The prior art systems, are either single-stage and only consider the members' accounts, or are multi-stage but only address a simple combination of members' and customers' accounts in their probability calculation. In other words, the prior art systems which do consider a tree-like structure of counterparties (composed of productive sub-assemblies distributed over stages) consider it sufficient to consider the simultaneous failure of each branch of the "tree". The invention, on the other hand, measures the inductive probabilistic chain of failures in the branches of the "tree" with a probabilistic calculation at each of the levels. More generally, the prior art systems, unlike the invention, do not take into account the measure of a probabilistic "catastrophic" chain of stresses at several levels of production.

The closest prior art systems are found in the domains of analyses of VaR using electronic methods in financial trading environments (banks, brokerage houses, . . . ). Here is a list of systems and various associations and promoters that have developed them:

Algorithmics™ by Ron Dembo

This system uses first a small-scale Monte Carlo portfolio simulation, and then a simplified portfolio calculation having a similar behaviour. Thereafter, it performs a more complete Monte Carlo simulation for a simplified portfolio. This system can regard the global portfolio of outstanding amounts with a counterparty and study the VaR of this portfolio (which is called the "credit VaR") as a function of market movements, which take into account the catastrophic movements (deterministic and depending on probability). The failure probabilities retained at each "stage" come from the rating agencies S&P™ or Moody's™, and are thus fixed, are not determined in a probabilistic manner, and do not depend on market movements. The "Credit VaR"s of several counterparties are added on, not included through an inductive method of probabilistic chain of failures.

CreditRisk+™ by Mark Holmes

This multi-stage system advocates taking into account, for the subsystems of a stage, a failure probability which is not fixed. But the process used is an uncertain process. That is to say, the that the subsystems' failure probabilities $S_{i,j}$ do not depend on the aggregated stresses $W_{z,i,j}$ to which they are subjected (neither indirectly through the uncertain values X nor in this particular case, through the market movements). They are notably no higher when the heightened stresses $W_{z,i,j}$ are more important.

This system proposes to combine the possible failures of the different counterparties by calculating the portfolio diversification's efficaciousness. But it does not propose the probabilistic measure of failure at the various stages of the chain of failures and the chain reaction of failures between stages using an inductive method.

CATS/Carma™ by Robert Geske

This system advocates a multi-period random draw of Monte Carlo to simulate the market movements, and afterwards, a rating of the counterparties by others, and finally the possible failure. The calculation of the Credit VaR is done for each counterparty with a distribution over due dates. This system uses neither the aggregation of the counterparties' failure risk by an inductive probabilistic method, nor do the failure probabilities depend on the stress state (market movements).

The proposed systems in the domain of finance by Algorithmics™, Credit Risk+™ amd CATS™, in contradistinction to other more current systems among prior art, apply to a "tree" stress chain structure for the various counterparties. It is in this sense that they can be considered as the closest to this invention. But, in contradistinction to the invention, this particular structure is not intended to succeed in producing a more exact measure of the probabilistic impact.

Thus, according to prior art, no account is taken of the fact that the non-mastering of the stress at a prior stage has an effect, i.e. that in this financial application of measure of portfolio risk, that the failure of one customer makes the position of his compensators more fragile, that is, it increases the stress on the next stage. In other words, according to prior art, the failure of the subsystems is not simulated from one stage to the other using a probabilistic inductive method. That is to say that the prior art does not simulate the failure of the system at the $1^{st}$ lowest level, and does not report this failure to the next $2^{nd}$ level before simulating in a probabilistic fashion the failure of subsystems at level 2, and so on.

Also, for the prior art systems, and in particular for the Algorithmics™ and CATS™ systems, the subsystem's (counterparty's) probability of failure is fixed. As the studied portfolio can contain options, the amount to pay by the counterparty at a given date can change from one random draw of the Monte Carlo method to another (that is, by the way, the reason why options are considered in academia as "contingent assets"). For Credit Risk+™, the portfolio contains only bonds. Thus, the amount to pay by the counterparty at a given date is known. Bonds are not "contingent assets" (except if they have floating interest rates or have clauses about convertibility or callback). The failure probability according to Credit Risk+™ results in an uncertain random draw. But the draw and the probability value which result from it are independent of the state of the market during the travel along the Monte Carlo "trajectory". On the other hand, according to the first variant recommended and described below and implemented by the invention, the distribution of the probability of the coefficient of failure for a subsystem $S_{i,j}$ is neither constant nor unknown, it depends on the state of the stresses on the subsystem $S_{i,j}$, thus on the state of the market. Instead, once this distribution is known, the coefficient value is unknown, please note, according to this distribution.

Additionally, according to prior art, and in contradistinction to the recommendations of the second variant recommended and described below for the implementation of the invented system, the prior art systems are based on that the reliability of the issuer is given by their Moody's™ or S&P™ rating. The prior art systems cannot separate the quality of an issuer and his size. According to the logic implemented by the most evolved systems, the only way to consider the size of an issuer consists of regarding an issuer who is small but reliable as having a very small probability of failure for a small amount, but which probability rises sharply starting from a certain amount, whereas regarding an issuer who is large but unstable as having a probability of failure of the same order of magnitude for a small amount as for a large amount. For the majority of prior art systems, the probability of failure is considered to be independent of the amount due, thus this distinction becomes irrelevant.

Finally, and contrary to the recommendations of the third variant recommended and described below in the implementation of the invention, prior art does not, in the probabilistic simulation, propose to implement uncertain catastrophic scenarios with given probabilities. Prior art in general proposes to perform stress tests whose goal is to study the consequences of a catastrophic movement such as a stock market crash. To do this, it is recommended to simulate a catastrophic scenario where all the parameters are introduced by the user, without uncertainty in these parameters. Certain compensation phenomena such as hedging, can then pass unnoticed, which is not the case if the stress test is itself uncertain (such as according to this invention).

The following prior art systems are far removed from the specifications of this invention, by the method of measuring impact which it implements.:

Credit Metrics™ and Risk Metrics™ by J.P. Morgan

These systems function counterparty by counterparty, according to the covariance matrix method, with the failure probabilities independent of market movements and supplied via the Internet. These systems do not advocate the means that are characteristic of this invention.

Credit Risk™ Boundary Rider™ by Steve Davis

This system, called "close-out netting module" calculates the involvement of each counterparty, while taking into account a tree structure of counterparties. The involvement at one level of the tree generates the "netting" of all branches that it carries. This system recommends neither aggregation of risk-of-failure of the counterparties by an inductive probabilistic method, nor probabilities of failure depending on market movements. This system thus does not advocate the means that are characteristic of this invention.

Hedge™ by Richard Sandor

This system uses a Monte Carlo draw for market movements, and then a calculation of the effect on the portfolios, and finally a draw for failure of the counterparties using an inductive probabilistic independent of the market movements, and a calculation of the global VaR. Thus, this system does not advocate the means that are characteristic of this invention.

KMV "EDF"™ by Oltech Vasicek

This system is based on a Markov chain. It evaluates, using a multi-period Monte Carlo method, the expected return from a stock. This system only takes into account loans and bonds and calculates the risk coming from the issuer. This system evaluates the risk from each counterparty. The probabilities of failure for each subsystem Is fixed. Thus, this system advocates neither the aggregation of risk of counterparty failures with a inductive probabilistic method, nor probabilities of failure depending on the amount of stress in the system (market movements). This system thus does not advocate the means that are characteristic of this invention.

Midas Kapiti™ by Misys (UK)

This system advocates neither the aggregation of risk of counterparty failure using an inductive probabilistic method, nor probabilities of failure that depend on the amount of system stress (market movements). This system thus does not advocate the means that are characteristic of this invention.

NetRisk™ by Eugene Shanks

This system advocates neither the aggregation of risk of counterparty failure using an inductive probabilistic method, nor probabilities of failure that depend on the amount of system stress (market movements). This system thus does not advocate the means that are characteristic of this invention.

The following prior art systems are further removed from the specifications in the current invention because of the fact that they are not concerned with "netting" of the counterparties (aggregation of stress):

FEA™ by Mark Garman
FNX™ by Farid Naib
Lombard Risk™ by John Wisbey
RAROC™ by Bankers Trust
Summit™ by Jean de Fontenay
Zoologic™ by Kenneth Garbade
Open Link™ by Coleman Fung

INDUSTRIAL APPLICATIONS OF THE INVENTION

The purpose of the invention (automatic probabilistic process for control of a chain of uncertain stress flows) such as desribed below can be used in numerous industries, equally manufacturing, financial or agricultural. Below, there is a description of the invention, firstly its definition and its global characterisation, i.e. applicable notably to the set of types of industrial and financial production that involves stress chains. Secondly, the invention is more specifically described for a manufacturing industry application (optimisation of the production in a factory with noise limitations). Finally, the invention is described for a particularly advantageous application in the financial industry, aiming at optimising the activity level of a clearing house—an exchange for chattels or raw materials—exposed to risks of failure of the counterparties (linked to the volatility of the market for the traded items) while conforming with the criteria for limits on the global risk—"Capital Adequacy"—in order to minimise the failure risk.

Outside of the industrial applications described below, the knowledgeable person will be able to apply the invention's principles to numerous other multi-stage industrial domains that have chained uncertainties, and notably for the control of production flow for energy as a function of the uncertainties of demand, of the availability of sources of energy, and the immediate limits on production capacity (local or global), and of the capacity of the energy transmission net; this while respecting "minimal" constraints, notably the availability for each user and/or regulatory constraints on pollution, (air, cooling water temperature, . . . ) and avoiding the disconnection of certain circuits.

The process and the device of this invention can equally be applied to chained industrial operational risks, notably in industries whose operation produces certain environmental problems such as noise or pollution; it can also be used in complex industrial systems which have catastrophic risk chains, such as nuclear power plants, oil and gas drilling platforms, and chemical factories.

The devices derived from this invention can also be applied to great advantage in the agricultural domain, particularly for the control of the procurement cycles for a country or a region as a function of the chained uncertainties of production (regional or world-wide) and the variations in the consumption of food, all while assuring a minimum supply to each inhabitant.

DESCRIPTION OF THE THREE EMBODIMENTS OF THE INVENTION WITH REFERENCE TO THE DRAWINGS

The appended figures represent schematically the characteristics of the probabilistic automatic operation of this invention, and also the three recommended variations for its application, and two specific applications.

Figure 1:
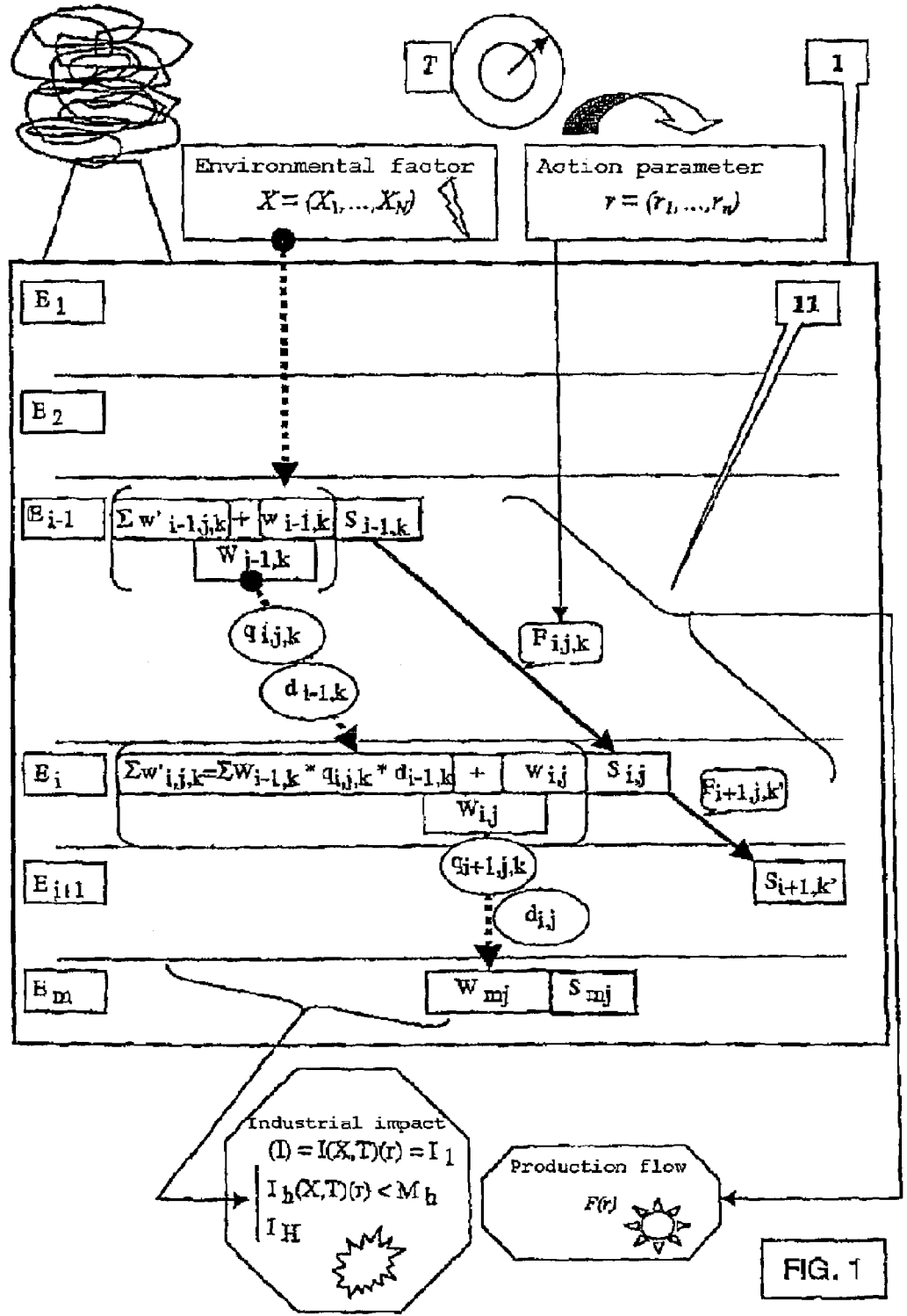
FIG. 1 shows schematically the general operation of one industrial production unit for which the application of the process and the production control device such as advocated by this invention.
Figure 2:
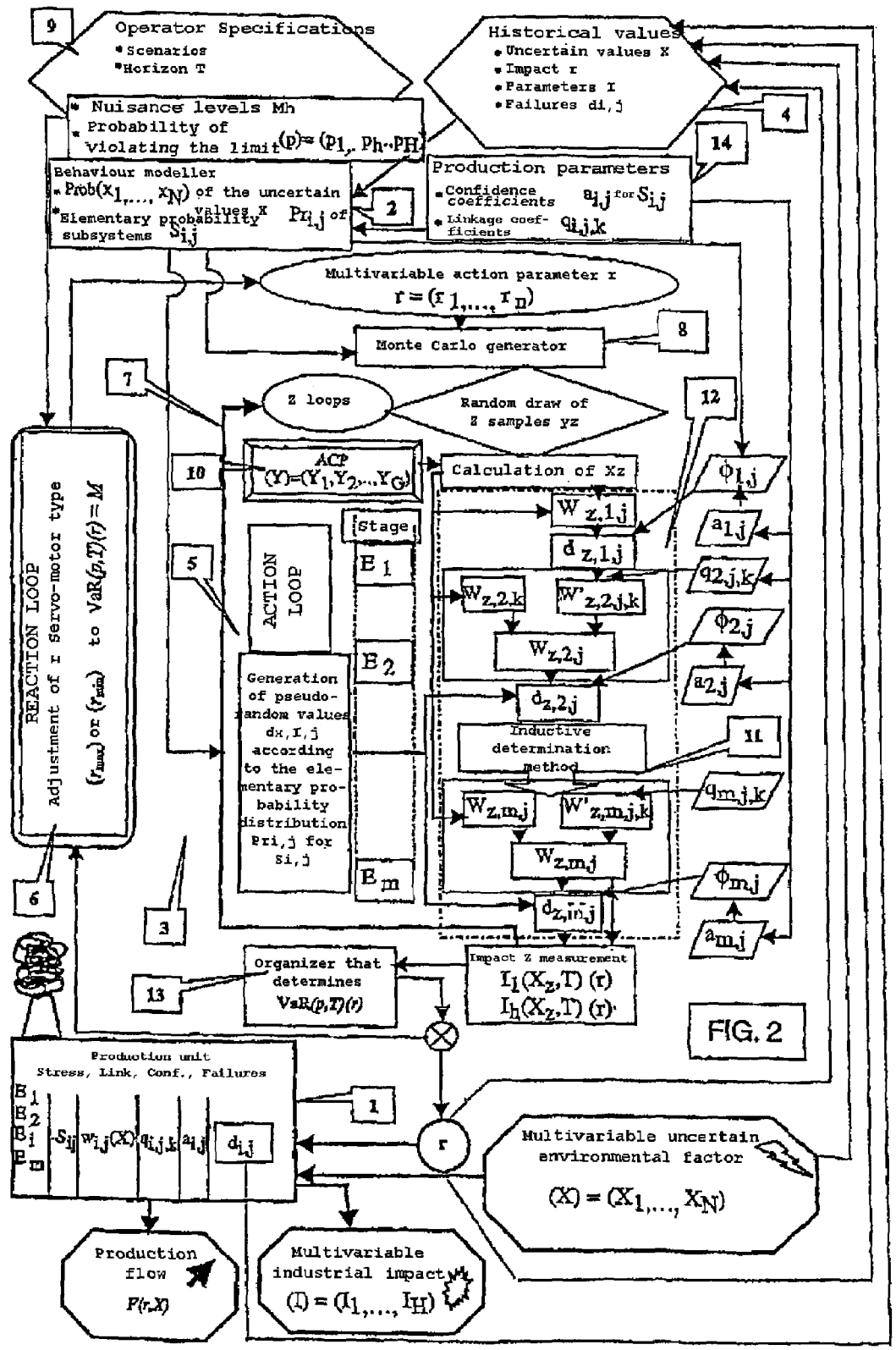
FIG. 2 shows in a general form the different application stages they have for the production control process and the specifics of the probabilistic automatic regulation according to the invention.

The FIGS. 1 and 2 describe the general configuration of an industrial or financial production system (1), to allow the application of this invention's process and devices.

The process and the automatic regulation 3 according to this invention are applied specifically to a multi-stage and multi-linked production. That is, they concern an industrial or financial production centre composed of several production stages called $E_1, \ldots E_m$, and each production stage $E_i$ is itself composed of productive subsystems $S_{i,j}$. These receive one or more production sub-flows $F_{i,j,k}$ from one or several subsystems $S_{i-1}$,k of the previous stage (except the first, i=1), and transmit one or more production sub-flows $F_{i+1,j,k}$ to one or several subsystems $S_{i+1,k'}$ of the following stage $E_{i+1}$ (except the last stage i=m).

The invention concerns the case where the production sub-flows $F_{i,j,k}$ can be controlled with the aid of a—possibly multivariable—industrial control parameter (r) or (r)= $(r_1, \ldots, r_n)$, and where the (global) industrial production flow results from a combination of production sub flows $F_{i,j,k}$.

The invention is specifically applied to an uncertain stress chain $W_{i,j}$ associated with an industrial impact I(X,T) (r) (in general harmful) possibly multivariable (I)=$(I_1, \ldots, I_h, \ldots, I_H)$. This impact I(X,T) (r) should be mastered (notably to avoid damage, or for regulatory reasons) within a time horizon T. It is the result of a cascading chain of aggregated stresses $W_{i,j}$ (measurable phenomena) suffered by each of the productive subsystems $S_{i,j}$.

The invention specifically concerns the types of production whose industrial impact I(X,T) (r) depends in a globally monotone manner (increasing or decreasing) on the aggregated stresses $W_{i,j}$ of the subsystems $S_{i,j}$ at the different production stages $E_i$, and where at least one of the elements of $I_h$ depends on:

a) the aggregated stresses $W_{m,j}$ of the subsystems $S_{m,j}$ at the last production step $E_m$, aa) a multivariable environmental factor of the production uncertainties $(X)=(X_1, \ldots, X_N)$, aaa) the time horizon T aaaa) and on the type of monotone global function (increasing or decreasing, in the same sense as the aggregated stresses $W_{m,j}$) of the industrial action parameter (r) through the intermediary stress aggregates $W_{m,j}$.

Each uncertain aggregated stress $W_{i,j}$ (with "catastrophic" local effect) suffered by a subsystem $S_{i,j}$ is in nominal the nominal mode contained at the level of subsystem $S_{i,j}$. But it can, in failure mode, be partially or totally transmitted to the following stage, $E_{i+1}$. That is, formally, each aggregated stress $W_{i,j}$ is the result (sum) of the following items:

b) one item is the uncertain stress $W_{i,j}$ pertaining to the productive subsystem $S_{i,j}$ and depending—in a known way but specific to the subsystem—on a multivariable environmental factor of the uncertain amount of production (X) and of the type of global monotony (increasing or decreasing) of the industrial action parameter (r).

bb) the other item is the uncertain stress $w'_{i,j,k}$ which comes from the combination of failures of certain of the productive subsystems $S_{i-1,k}$ from the previous stage $E_{i-1}$, following the stress to which they themselves are subject.

According to the invention each of the transmitted stresses w'I,j,k is expressed a combination (which is formally written in the form of a sum ($\Sigma$) for each of the subsystems in the previous stage of the products):

c) of he aggregated stresses $W_{i-1,k}$ of the subsystem $S_{i-1,k}$ cc) of the linkage coefficient $q_{i,j,k}$ constant, or known and not uncertain ccc) and of an unknown transmission coefficient $d_{i-1,k}$ for the productive subsystem $S_{i-1,k}$, varying between the limits 0 and 1 (this is also called the failure coefficient).

Referring to the FIGS. 1 and 2, it can be observed that the invention is implemented specifically in a frame where the elementary failure probability distribution $Pr_{i,j}(X,T,r,W_{i,j},a_{i,j})$ of each of the productive subsystems $S_{i,j}$ is known. It is expressed as the electronic behaviour modelling device (2). This behaviour modelling module (2) complements the automated probabilistic unit (3) and is interfaced with the operator of the automatic system (3). It electronically determines the elementary failure probability values $Pr_{i,j}$ and makes them depend on:

d) the uncertain multivariable X describing the uncertain production, dd) the time interval T ddd) the industrial action parameter r dddd) the stress $W_{i,j}$ ddddd) the confidence coefficient $a_{i,j}$, possibly multivariable, pertaining to each productive subsystem $S_{i,j}$ and whose characteristics result notably, but not exclusively, depend on a historical analysis of the failure of the productive subsystems $S_{i,j}$.

These confidence coefficients $a_{i,j}$, as well as the linkage coefficients $q_{i,j,k}$, are fixed and are characteristic of the production centre, (1), (FIGS. 1 and 2). More precisely, they may vary over time, but they are inserted before each launch of the control loop and remain fixed while the control loop is running. They are reintroduced by the operator into a memory module (14) called the automatic production parameters (3) (FIG. 2).

As can be seen in FIG. 1, according to the invention, the multi-linked configuration (of the stress chain) can be:

either tree-like—that is for each subsystem $S_{i-1,k}$ at a stage $E_{i-1}$, one of the linkage coefficients $q_{i,j,k}=1$ and the others are zero; this corresponds to the case where a productive subsystem at stage $E_{i-1}$ can only transmit its stress $W_{i-1,k}$ to a single productive subsystem in the following stage $E_i$ or, in the more general case, matrix-like, and in this case each linkage coefficient $q_{i,j,k}$ can take any value.

According to the invention, the abovementioned transmission coefficients $d_{i,j}$ can be:

either binary—they only take on the values 0 and 1, that is a productive subsystem Si,j fails or it does not fail, but there is no such thing as partial failure—and in this case, the elementary failure probability distribution $Pr_{i,j}(X,T, r,W_{i,j},a_{i,j})$ for each productive subsystem Si,j reduces to a single number $p_{i,j}(X,T,r,W_{i,j},a_{i,j})$ which is the probability that it fails at the this location (i.e. $d_{i,j}=1$)—.

or, in a more general case, any (continuous) i.e. they can take on any value between 0 and 1, partial transmission of stress is possible, and the elementary failure probability distribution $Pr_{i,j}(X,T,r,W_{i,j},a_{i,j})$ from each productive subsystem is a positive function defined on the interval [0,1] over the possible values of the transmission coefficients.

The inductive usage—inside the inductive probabilistic processor 12 (FIG. 2 and onwards) which will be dealt with later—of the influence of the elementary failure probabilities $Pr_{i,j}$ of the subsystem $W_{i,j}$ at stage $E_i$ on the stage $E_{i+1}$ is one of the principal specifics of this invention.

The control process according to this invention is specifically implemented in the case where the variations—at the time horizon T, where the uncertain sub-quantities Xi constitute the abovementioned multivariable X, the uncertain environment—are quantifiable by a rule of joint probability Prob $(x_1, \ldots, x_N)$. The $x_i$-s constitute the generic state which can be taken by the uncertain subquantity $X_i$. In general, the subquantitity's characteristics, especially the average, the variance and the correlations as well as its behaviour at the extreme ends, result from a statistical analysis of the recorded history of the uncertain subquantities $X_i$.

With reference to FIG. 2, it can be observed that the automatic unit 3 electronically generates the correct joint probabilities $Prob(x_1, \ldots, x_N)$ according to the historical record of the uncertain quantities stored in the interior of the auxiliary memory box 4, the automation histories 3 and the probabilities are given to the Monte Carlo generator 8 to enable it to do the random draws $y_z$.

Finally, as can be seen from FIG. 1, the invention is implemented in the case where the elementary impact components $I_h(X,T)(r)$ of the abovementioned industrial impact $I(X,T)(r)$ from the production flow must not pass beyond the levels of the predefined "nuisance" levels $M_k$, be it going above (type 1) or going below (type 2), this with a industrial probabilistic reliability of $Prob[I_h(X,T)(r)<M_h]>p_h$ (type 1) or $Prob[I_h(X, T)(r)>M_h]>p_h$ (type 2). The abovementioned nuisance levels Mk and the probabilities ph are imposed notably by regulatory authorities or by the imperatives of critical rupture and are taken into account in a memory module 9 called the operator specification, part of the automation process 3.

The process implemented by this invention's control device (automation) is described in reference to FIGS. 1 and 2. According to the process and in a known manner, an electronic sampling is effected, as accurate as possible, as a function of the industrial action parameter (r), the time interval T. The state of the production F(r) consists of:

e) the values which can be taken by the subfactors of the uncertain quantity $X_i$, ee) the stresses $W_{i,j}$ of the productive subsystems $S_{i,j}$, eee) their failure coefficients $d_{i,j}$, eeee) the elementary impact components $I_h(X,T)(r)$ eeeee) the production sub-flows $F_{i,j,k}(r)$ eeeeee) the production flow F(r).

The action loop function 5 of the control function automation 3 is to electronically calculate, for the time horizon T, as a function of the possible values of the industrial control function (r), the multivariable estimator for the maximal impact VaR(p,T) (r) with a threshold probability possibly multivariable (p)=($p_1$, ..., $p_h$, ..., $p_H$) imposed by the conditions stored in memory 9 of the operator specifications.

This is defined as a vector Var(p,T) (r) of limits VaR($p_h$,T) (r) such that the abovementioned elementary impact components $I_h$(X,T) (r) only exceed their limits (upwards or downwards depending on system type) with a probability of (1−$p_h$), that is Prob[$I_h$(X,T) (r)>VaR$_h$($p_h$,T) (r)=(1−$p_h$) (type 1) or Prob[$I_h$(X,T) (r)<VaR$_h$($p_h$,T) (r)=(1−$p_h$) (type 2).

According to this known frame of implementation of the invention, the industrial action parameter (r) is automatically—as part of the production control 3—regulated over time within the action loop 6. The industrial action parameter is regulated to its maximum or minimum multivariable value ($r_{max}$) or ($r_{min}$) while maintaining the abovementioned estimator of the effect VaR(p,T) (r) on the right side of its authorized nuisance level M. That is, for each component h, the reaction loop 6 of the automatic process 3 electronically "extremises" the VaR$_h$($p_h$,T) ($r_{max\ or\ min}$)<$M_h$ (type 1) or VaR$_h$ ($p_h$,T) ($r_{max\ or\ min}$)>$M_h$ (type 2).

The process of the invention consists in, additionally, taking care of the sampling of the state of the production according to a pseudo-random method of the "Monte Carlo" type, where the global sampling number is Z. This is implemented by the Monte Carlo generator 8.

To this end, the invented process in general contains the implementation of the following stages, electronically in the interior of the modelling unit 2 and the action loop 5 of the automatic process 3:

f) To make, with the aid of the electronic modelling unit, a choice (validated by adequate classical statistical tests) of model which has the simultaneous behaviour Prob (x1, ..., xN) of the different uncertain production subfactors (Xi), (it can be for example a normal distribution, log-normal, or more generally, a distribution of levels of uncertain production subfactors ($X_i$) justified by observations of historical data) and to transmit this choice to the action loop 5.

ff) As an aside (with the goal of accelerating the speed of the random draw loop 7 and thus improve the performance and reliability of the control automation 3, allowing the time horizon T to be reduced) to handle electronically within the processor "ACP" 10 an analysis by principal components (ACP) of the different uncertain production quantities, that is to consider the relations which express the behaviour of these subfunctions of these uncertain production quantities ($X_i$) as a function of the unknown quantities' common factors, independent from each other, which, under the form of an indexed uncertain multivariable factor of the production environment (Y)=($Y_1$, $Y_2$, ..., $Y_G$) where the ($Y_g$) are called common subfactors of the indexed uncertain production quantity, with, in general G<<N. This disposition is not required.

fff) After that, starting from a part of the abovementioned behavioural model Prob($x_1$, ..., $x_N$) of the different indexed uncertain production quantity ($X_i$)'s subfactors, and the distribution parameters of the indexed uncertain quantity (Yi), electronically construct, using the Monte Carlo method, and thanks to the Monte Carlo generator 8:

either a number Z of pseudo-random samples of vectors describing the indexed state $x_z$=($x_{z,1}$, $x_{z,2}$, ..., $x_{z,N}$), (z=1, ..., Z), possible values of the abovementioned common subfactors for the indexed uncertain production quantity ($X_i$). [This electronic production is achieved from parameters that describe each of the abovementioned subfactors of the uncertain quantity Xi taken individually, but also from the correlations linking them to each other, notably according to the decomposition methods known by Cholesky and as "singular values"

or, when the ACP is used, a number of pseudorandom samples Z of the state vectors $y_z$=($y_{z,1}$, $y_{z,2}$, ..., $y_{zG}$), (z=1, ..., Z) of the possible values of the abovementioned subfactors of the uncertain industrial production index ($Y_g$), then electronically determine, for each pseudorandom sample of the abovementioned specific state vector yz, the value corresponding to the uncertain multivariable factor $s_z$=($x_{z,1}$, $x_{z,2}$, ..., $s_{z,N}$), according to the coefficients of the analysis into principal components (ACP).

ffff) To electronically determine inside the inductive probabilistic processor 12, for each pseudo-random sample of the abovementioned vector specific for the industrial state $x_z$, and as a function of the abovementioned action parameter (r), the level corresponding to the multivariable industrial impact I($x_z$,T) (r).

fffff) Inside the organizer 13, to electronically arrange and bring together the Z results, end, for each elementary impact component $I_h$, to electronically render compatible for each value V which can which can affect the component Ih the number $Z_h$(V) of the abovementioned electronic samples for which the abovementioned impact component $I_h$($x_z$,T) (r) passes (by being too high or to low, depending on the type 1 or 2 of the production to be controlled) the value V, and thus electronically calculate the pseudo-probability $p'_h$(V)=$z_h$(V)/Z of passing the value V by the abovementioned impact component $I_h$.

ffffff) To electronically calculate, from the above, the variations of VaRh(ph,T) (r) for the imposed ph, and that as a function of the abovementioned action parameter (r), [defined by $P_r$[$I_h$(X,T) (r)> (or <) VaR$_h$]=(1−$p_h$)].

fffffff) Inside the reaction loop 6, to determine the "extremal" multivalue, (rmax) or (rmin) depending on the type of system, for which the multivariable estimator VaR(p, T) (r) takes exactly the regulatorily defined value N and to adjust—by a servo activator or servomotor—the value of the action parameter (r) to this level, possibly multivariable.

A principal new characteristic of this control process and device (automation) 3 as advocated by the invention consists of that, to electronically generate the elementary components of the impact $I_h$($x_z$,T) (r) which corresponds to each sample of the uncertain quantity $x_z$, the aggregated stress levels $W_{z,i,j}$ are electronically determined for each pseudo-random sample of the abovementioned uncertain multivariable ($x_z$), and as a function of the industrial action parameter (r). These stress levels $W_{z,i,j}$ are determined for each of the productive subsystems $S_{i,j}$ by a inductive probabilistic method 11, starting at the first stage $E_1$ and going to last step $E_m$. That is, according to this principal method to implement the invention, and inside the abovementioned inductive probabilistic processor 12, starting at the first stage E1 of the production unit, and for each pass—done by the Monte Carlo generator 8—through the random draw loop 7, that is for each pseudo-random sample yz=(yz,1, yz,2, ..., yz,G) of the index vector (when ACP is used) or for each random draw of the pseudo-random samples of the state vector xz–(xz,1,xz,2, . . . , xz,G) (when ACP is not used):

g) First, measurement of the actual stresses $w_{i,j}(x_z)$ for each of the subsystems $S_{i,j}$ at stage E1 of the industrial production; these are used in conjunction with the aggregated stresses $W_{x,1,j}$.

gg) Next, generate an electronic pseudo-random generation of the abovementioned failure coefficient dz,1,j for each of the productive subsystems Si,j at step E1, using the abovementioned elementary failure probability distribution $Pr_{1,j}(x_z,T,r, W_{z,1,j}, a_{1,j})$ for the productive subsystem S1,j, such as is supplied by the modelling unit 2. To do this, according to the invention, electronically generate—at the inductive probabilistic processor 12—a pseudo-random number uz,1,j in the interval [0,1], and electronically apply to it the reverse distribution function $\Phi_{1,j}(X_z,T,r,W_{z,1,j},a_{1,j})$ $(u_{z,1,j})$ of the elementary failure probability $Pr_{1,j}(x_z,T,r,W_{z,1,j},a_{1,j})$ of the productive subsystem $S_{1,j}$.

ggg) Measure the abovementioned actual stress $w_{1,2,k}$ for each subsystem $S_{2,k}$ at step $E_2$ of the industrial production.

gggg) Electronically evaluate the aggregated stress Wz,2,k of each subsystem S2,k at step E2, using the formula $W_{z,2,k} = w_{2,k}(x_z) + \Sigma_j\ w'_{z,2,j,k} = w_{2,k}(x_z) + \Sigma_j\ W_{z,1,j}(x_z) * d_{z,1,j} * q_{2,j,k}$.

At the core of the probabilistic inductive processor 12, the operations (gg through gggg) are iterated in an inductive manner 11 of probabilistic determination of aggregated stresses $W_{i,j}$ from stage to stage until the aggregated stress $W_{z,m,j}$ of the productive subsystem $S_{m,j}$ at stage $E_m$. The industrial multivariable impact value $I(x_z,T)$ (r) linked to the Monte Carlo sample with index z.

This process is repeated through (Z) loops of the inductive probabilistic processor 12.

One of the advantages of the process and device built according to this principal implementation of the invention is that for each interlocked Monte Carlo sample constituted of the uncertain environmental factor $X_z$ and the "probabilistic cascade" of the failure coefficients $d_{z,I,j}$ emitted at the core of the inductive probabilistic processor 12:

The industrial impact I is measured while taking into account both the cascade chain of the stresses $W_{i,j}$ at each of the production stages and the uncertain character of the failure coefficients $d_{z,j,j}$.

A more precise measure is obtained (compared to prior art methods) of the probability of the impact I(r) violating a given level V, and thus, of the estimate of the maximum impact VaR(p,T)(r).

Such that:

The effective violation frequencies authorised by the elementary components $I_h$ measured automatically at 3 according to the invention are nearer to the target values $(1-p_h)/T$.

This allows a reduction in the industrial safety margins to be applied at the resistance level M.

As a consequence, this permits the production flow F(r) to be raised while still respecting the given regulation.

Thus, thanks to this control process, a more efficient industrial production control automation can be constructed.

A first auxiliary characteristic variant of implementation and control device according to this invention consists additionally of that it is imposed electronically that the failure coefficients $d_{z,1,j}$ of the productive subsystems $S_{i,j}$ are higher when the aggregated stresses $W_{z,I,j}$ are more important. That is, that in the method implemented by the inductive probabilistic processor (12) for the evaluation of the stress transmissions from one stage to the next higher stage, the fact is taken into account that in the majority of cases, the higher failure coefficients appear precisely when the stress is important, pulling with it a sensitive increase of the mean level of the stress transmitted to the next higher step, and, as a consequence, of the amount of induced global effect.

To implement this advantageous variant of the invention, functional rules are imposed at the modeller 2. These rules are such that, for some threshold value d<1, it electronically fixes the elementary failure probabilities $Pr_{i,j}$ in such a fashion that $Pr_{i,j}(x_z,T,r,W_{z,i,j},a_{i,j})$ $[d_{z,i,j} > d]$ grows with the aggregated stress value $W_{z,i,j}$. To do this, at the heart of the modeller 2, the description parameters for the inverse distribution function $\Phi_{i,j}(x_?,T,r,W_{z,i,j},a_{i,j})$ $(u_{z,i,j})$ are fixed in such a manner that the function becomes an increasing function of the parameter $W_{z,I,j}$, all other parameters and variables, including $u_{z,i,j}$ remaining fixed.

Two practical variants of the implementation of this particularity are given below, in reference to FIGS. 3 and 4, and further in FIGS. 5 and 6. According to the first auxiliary variant of the invention, at each production stage $E_i$ and for a subsystem $S_{i,j}$, a greater probability $d_{z,i,j}$ is induced for the transmission of a given proportion of stress $W_{z,i,j}$ towards the next higher stage. It is better to take into account the fact that, in the majority of cases, the elevated failure coefficients appear precisely when the stress is important, pulling with it a sensitive increase in the mean level of stress transmitted to the next higher step, and, as a consequence, the amount of the induced global effect.

One of the advantages of the process and device according to this first auxiliary variant of the invention is that:

One corrects one of the shortcomings of classical control systems, which, by not taking into account the complementary process, causes an important sub-evaluation a number of cases where the industrial impact violates the authorised limit M.

One avoids one of the problems associated with classical systems, which, in order to respect the industrial norms, tend to use wider safety margins, and thus to reduce the production flow.

A second auxiliary variant characteristic of the procedure and device according to this invention should preferably be implemented for production of a type that has diversified stress links. That is, a production where the productive subsystems have the characteristics of size and reliability that are independent.

In this case, certain productive subsystems Si,j can be of small size, as well in terms of the production subflow as in terms of own stress, reliable at their scale, that is their failure coefficients for an aggregated stress of the same order of magnitude as their own stress is on average small, but such that a large aggregated stress can bring about almost certain failure. While there are other productive subsystems $S_{i,j}$ have the opposite property. That is, their productive subflow is elevated just as their own stress. Their failure coefficient has a high but relatively stable average value, even while the aggregated stress is important.

According to this variant of the invention, at the heart of the production parameter memory 14 the confidence coefficients $a_{i,j}$ are locked electronically to a size which contains at least two independent components:

A first component of the confidence coefficient $a_{i,j}$ is linked electronically to the size of the subsystem $S_{i,j}$ to which it pertains A second component of the confidence coefficient $a_{i,j}$ is linked to the reliability of the productive subsystem $S_{i,j}$ to which it pertains Two practical variants of the implementation of this particular method are given below in FIGS. 3 and 4 and further in FIGS. 5 and 6.

In this way is obtained a more reliable and precise estimate of the reality of the linkedness of the production failures, which allows a reduction of the safety margins, and, as a consequence, this brings about an increase of production flow F(r). This variant turns out to be particularly effective when the action variable (r) is a multivariable, and each of its components primarily involves a precise level of a productive subsystem. In this case, it will be possible to individually control each of the productive subsystem flows, and to optimise them as a function of their size.

A third auxiliary characteristic variant of this process and device according to this invention is applied specifically to a production whose environmental multivariable uncertain production factor X is subject, with a small probability, to movements that are very important and impossible to predict. According to this variant, (to electronically construct the abovementioned sampling of the state of production according to a pseudo-random Monte Carlo method, where the number of random draws is Z), a historical and "catastrophic" probabilistic combination is applied electronically.

A choice is made (validated by adequate classical statistical tests) of a behavioural simultaneous model of the different uncertain production subsystems ($X_1$), (it can be for example distributions that are normal, log-normal, or more generally, a subsystem level distribution that is justified by historical observations of these uncertain quantities). A standard sub-probability $P_s$ of occurrence is attributed to this historical model. For the historical model, with the help of a Monte-Carlo generator 8, $Z_s$ standard pseudo-random samples of the state vector $x_z = (x_{z,1}, x_{z,2}, \ldots, x_{z,N})$ are generated, [for z= 1, ..., $Z_s$ possible values of the abovementioned common uncertain subfactors indexed to production ($X_1$))], and one applies to each of these $Z_s$—called standard samples—a weight called standard, $m_s = P_s/Z_s$.

A choice is made of one or several so called "catastrophic scenarios" with different uncertain production factors ($X_1$); indeed the subfamilies of catastrophic situations from which the characteristic averages and deviations are defined:
either in the absolute
or by referring to the characteristics of distribution obtained from analysis of the historical record included in the auxiliary memory 4.

For this catastrophic model, with the help of a Monte-Carlo generator 8, $Z_c$ pseudo-random samples are electronically generated for the index vector $x_z = (x_{z,1}, x_{x,2}, \ldots, x_{x,c})$, [for z=1, ...,$Z_c$] the possible multi-values for the abovementioned uncertain production subfactors ($X_1$). To each of the $Z_c$, called "standard samples", a weight is applied, called catastrophic, $m_c = P_c/Z_c$. There may be several catastrophic models, applied with probabilities $P_{c1}, \ldots, P_{cn}$, for which as many sub-families of pseudo-random samples.

For each of the $Z = Z_s + Z_c$ (or $Z = Z_s + Z_{c1} + \ldots Z_{cn}$) pseudo-random samples of the abovementioned specific state vector $x_z$, and as a function of the abovementioned action parameter (r), the level corresponding to the multivariable industrial impact vector $I(x_z,T)$ (r) is determined electronically.

The Z results are reorganised and brought together electronically. For each elementary impact component $I_h$, and for each value V which can reach the component $I_h$, the weight $Z_{Ph}(V)$ of the abovementioned samples is calculated [sum of the number of electronic samples for which the abovementioned impact component $I_h(x_z,T)$ (r) violates (too low or too high, depending on whether production of type 1 or 2 to controlled) the value V multiplied by the associated weights $M_s$ or $M_c$)].

In this case, we calculate the pseudo-random probability p'$_h$(V)/Z of violation of the value V by this impact component $I_h$. Then, in a classical fashion:
from this, we deduce electronically the variations of VaR$_h$ ($p_h$,T) (r) for the imposed value of $p_h$, this a function of the abovementioned action variable (r), [defined by Pr[$I_h$(X,T) (r)> (or <) VaR$_h$]=(1−$p_h$)].
we determine the extremal multi-value ($r_{max}$) or ($r_{min}$) depending on the type of system, for which the multi-valued estimator VaR(p,T) (r) takes exactly the value allowed by regulation, or of breakage M, and
we adjust by a servo activator or servo motor the value of the action parameter (r) to this level, possibly multivariable.

According to this third variation of the invention, we correct the bias observed between the actual probability distribution of the uncertain values ($X_1, \ldots, X_N$) and those of the values taken during the historical recording of the characteristics of the process. If certain events (with grave consequences and whose probabilities cannot be considered negligible) do not in fact happen during the period when the historical record was made, we nevertheless impose on the control automation 3 to take them into account. If, by a compensatory phenomenon, the simulation of a definite event did not any important industrial impact, thanks to the simulation of the sub-family of events, we will nevertheless avoid this fortuitous compensation, and keep the real risk linked to this catastrophe.

One of the types of major applications is to control all harmful effects (such as pollution, . . . ) of a staged productive apparatus, each stage of which is both susceptible to production of this harmful product and to transmit it to the following step, but also has the ability to master it at its level.

The multi-stage structure to which this invention is applicable can appear: either at the production apparatus itself, or at the control process for the harmful effect.

Figure 3:
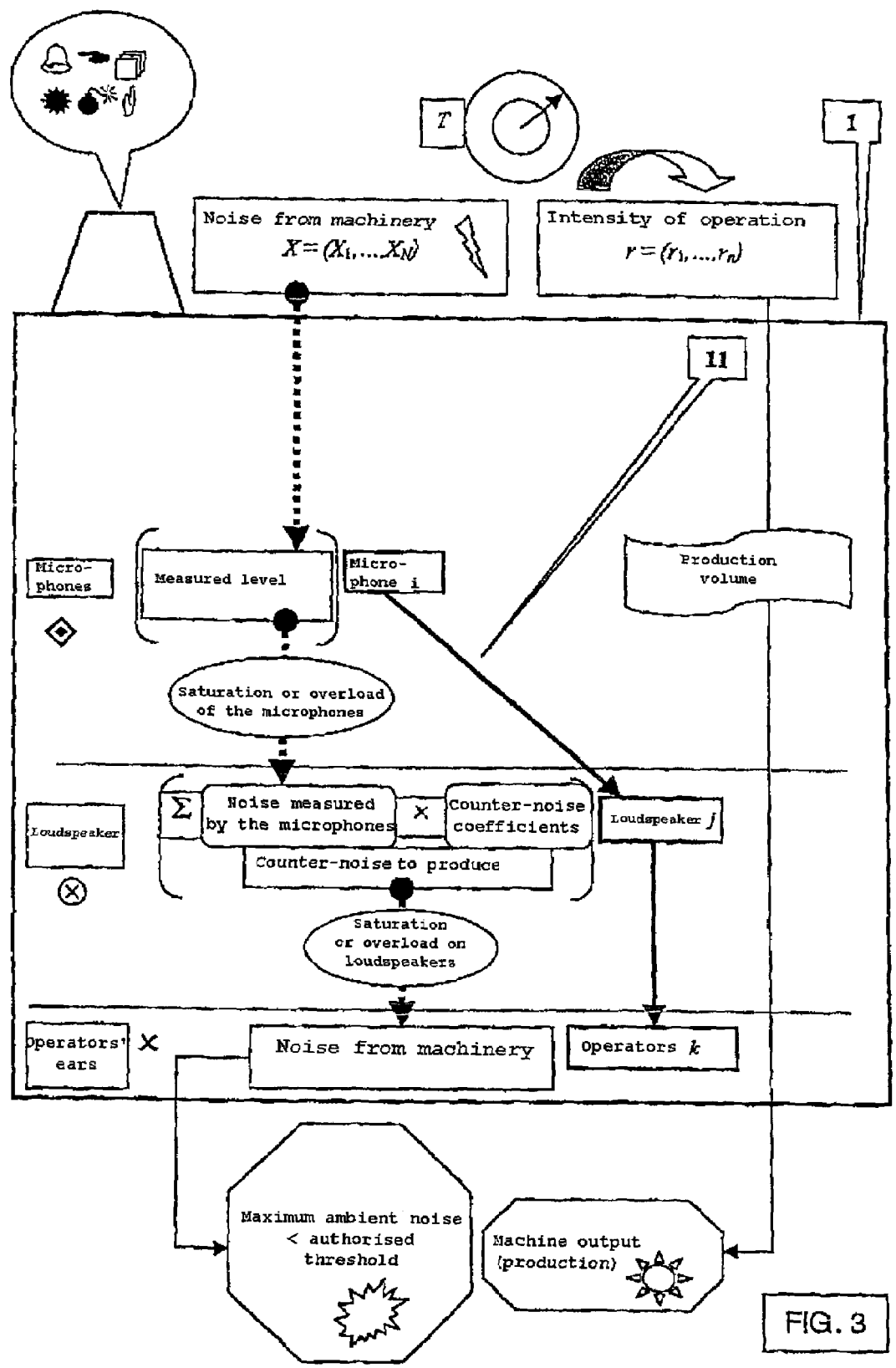
FIG. 3 shows schematically how to organise the factory in order to apply the process and the control devices according to the invention, in order to optimise the production, while nevertheless controlling that the noise level within the factory is kept below a level set by regulations.

As an example of this last configuration, FIG. 3 represents schematically the factory organisation to apply the control procedure and device according to this invention, in order to optimise production, while nevertheless controlling that the internal noise in the factory is below a level set by regulation. It should be noted that the maintenance of noise and vibrations under a limit can be linked not necessarily to a regulatory constraint, but to a breakage limit linked to the global vibration intensity of the platform on which the machines are placed, for example. FIG. 4 represents the different stages of the implementation and the specifics of the probabilistic automation 3 of the factory production control, and of the noise reduction. According to this application of the invention, the industrial production centre is 1 is a factory containing noisy tool machines ($S_{1,j}$) whose production intensity (r), i.e. their production rate, can be controlled. The more this intensity (r) is increased, the stronger the noise (I) produced.

For regulatory reasons, tied to machine operator health, the noise must not pass beyond certain limits, except with a very small probability. To reduce this noise, a known system has been installed called "counternoise", functioning with the help of a string of microphones and loudspeakers placed in the machine hall. The microphones register the noise at different strategic places in the hall and transmit it to a programmed calculator, which, in a quasi-instantaneous fashion, transmits a signal to the loudspeakers distributed through the hall. This signal, called "counternoise" is such that, if the microphones and the loudspeakers function correctly, it compensates the noise from the machines, using the effect of waves of opposite phase. It is possible, in this fashion, cancel a very large proportion of this noise (up to over 90%).

Generally speaking, the counternoise is, as a first approximation, a linear combination of the signals picked up by the microphones. It is the coefficients of this combination which the calculator recalculates all the time using a feed-back system. This part is known by prior art.

Unfortunately, the microphones and loudspeakers are subject to saturation, and, in a more serious fashion, might overload and not function at all. These imperfections translate directly to an increase in resulting noise throughout the hall, and require a reduction in the machines' production rate. The present invention applies advantageously to minimising this reduction, or, if preferred, to maximize the functional intensity, while respecting the noise control rules, specifically in the case where the command to reduce (or increase) production does not have an immediate effect, but has a time delay T. It is imperative to predict the probability distribution of the resulting noise amplitude in the hall during this delay, in order to assure that it will only surpass the regulation level with a probability imposed by regulation.

The multi-stage and multi-linked system is formed by the machines, the microphones and the loudspeakers. The staged structure of the global system, formed by the productive subsystems $S_{ij}$, appear in the following form:

Stage E1: Machines
Stage E2: Microphones
Stage E3: Loudspeakers

We have here a matrix structure. In effect, the subsystems at each stage are capable of transmitting their noise or their signal to all the subsystems in the following stage.

The uncertain multivariable factor (X) is the noise produced by the various machines, as a sound wave. This noise is obviously uncertain, even with a fixed and known production intensity for the machines, because, even if its amplitude is, in certain cases, purely a function of the production intensity of the machine, the wave itself, in particular, its phase, is uncertain.

The time horizon T is the delay which separates the command for machine intensity and the actual variation of this intensity. It is during this delay that an unknown variation of the noise might surpass the norm.

In this application, only in the first stage, composed of the machines, is there a production sub-flow $F_{1,j}$. The production flow F is the result of this sub-flow.

The industrial action parameter (r), here a multivariable, is the machines' function intensity (production rate). Each of the components corresponds to one of the machines.

The industrial impact (I), (see §a-aaaa) multivariable also in this application, is the resulting noise in the hall, after correction by the counternoise, such as it is perceived by the operators. It has as many components as there are ears of operators functioning in the hall.

The "self" stress $W_{1,j}$ (see §b) of the machines, which is also their aggregated stress $W_{1,j}$ as this is the first stage, is the noise that they produce. At this stage, the transmission coefficients $d_{1,j}$ (see §ccc) is not uncertain, and stays equal to 1, as the machines do not control any noise by themselves. We can conceive an antinoise protection at the machines, but we come back to the case without protection, considering that the correct "self" stress is the noise coming from the set of machine-and-its-protection.

The transmitted stress $w'_{2,j,k}$ (see §bb) from the machine S1,j to the microphone S2,k is the noise created by the machine, i.e. the "self" stress of the machine, multiplied by sensitivity coefficient $q_{2,j,k}$ for the microphone to this noise (see §cc). The self stress $w_{2,k}$ for the microphone is the result of sources of noise other than from the machines, picked up by the microphone. The aggregated stress $W_{2,k}$ (see §c) us the actual total noise picked up by the microphone.

When the microphone saturates, or even worse, overloads, the actual noise can differ from the signal registered. The relation between the registered signal and the actual noise $W_{2,k}$ is the transmission coefficient $d_{2,k}$ for the microphone (see §ccc). In the case where the microphone has been overloaded, no signal is registered, and $d_{2,k}=0$. Perfect microphone function on the other hand means that $d_{2,k}=1$. In general, this transmission coefficient has a value between 0 and 1, with a probability distribution that depends on a confidence coefficient $a_{2,j}$, possibly multivariable (see §ddddd).

The microphone signal is then transmitted to the central programmed calculator which redistributes it to the various loudspeakers while applying the counternoise coefficients $q_{2,j,k}$ (see §cc). This denotes that each loudspeaker $S_{3,k}$ should reproduce a signal which results from the signals transmitted from the microphones $S_{2,j}$ to the central programmed calculator, with the coefficients $q_{2,j,k}$ applied.

The transmitted stress $w'_{3,j,k}$ (see §bb) from the microphone $S_{2,j}$ to the loudspeaker $S_{2,k}$ is thus equal to the product of the aggregated stress from the microphone $W_{2,j}$ and its transmission coefficient $d_{2,j}$ and the counternoise coefficient $q_{2,j,k}$.

The loudspeakers do not have a "self" stress. Their aggregated stress $W_{3,k}$ is equal to the signal which they are requested to produce, i.e. the resultant of the transmitted stresses.

If a loudspeaker $S_{3,k}$ saturates, or worse, overloads, the sound it emits will differ from the received signal. Its failure coefficient $d_{2,k}$ is the ratio between the emitted sound and the received signal. As for the microphones, the probability distribution of the failure coefficient $d_{3,k}$ depends on a confidence coefficient $a_{3,k}$, possibly multivariable (see §ddddd).

In the ideal case where the microphones and the loudspeakers function perfectly, the counternoise reproduced by the loudspeakers exactly compensates the noise from the machines, in a quasi-uniform fashion throughout the hall. The operators that are present only suffer from the residual noise that is much reduced. On the other hand, increased noise results partly from imperfections in the microphones, partly from imperfections in the loudspeakers. The total noise suffered by an operator $O_k$ resulting partly from residual noise, partly from the saturation or overload of microphones and loudspeakers, is given by the formula:

$$I_k = B_k + \Sigma_j\, q_{4,j,k}(d_{3,j}\, W_{3,j} + \Sigma_i(1-d_{2,1})q_{2,1,j}W_{2,i})$$

where:
$q_{4,j,k}$ is the sensitivity of operator $O_k$ to the loudspeaker $S_{3,j}$
$B_k$ is the residual noise which would in any case be perceived by operator $O_k$
$I_k$ is the industrial impact component (I) linked to operator $O_k$.

Figure 4:
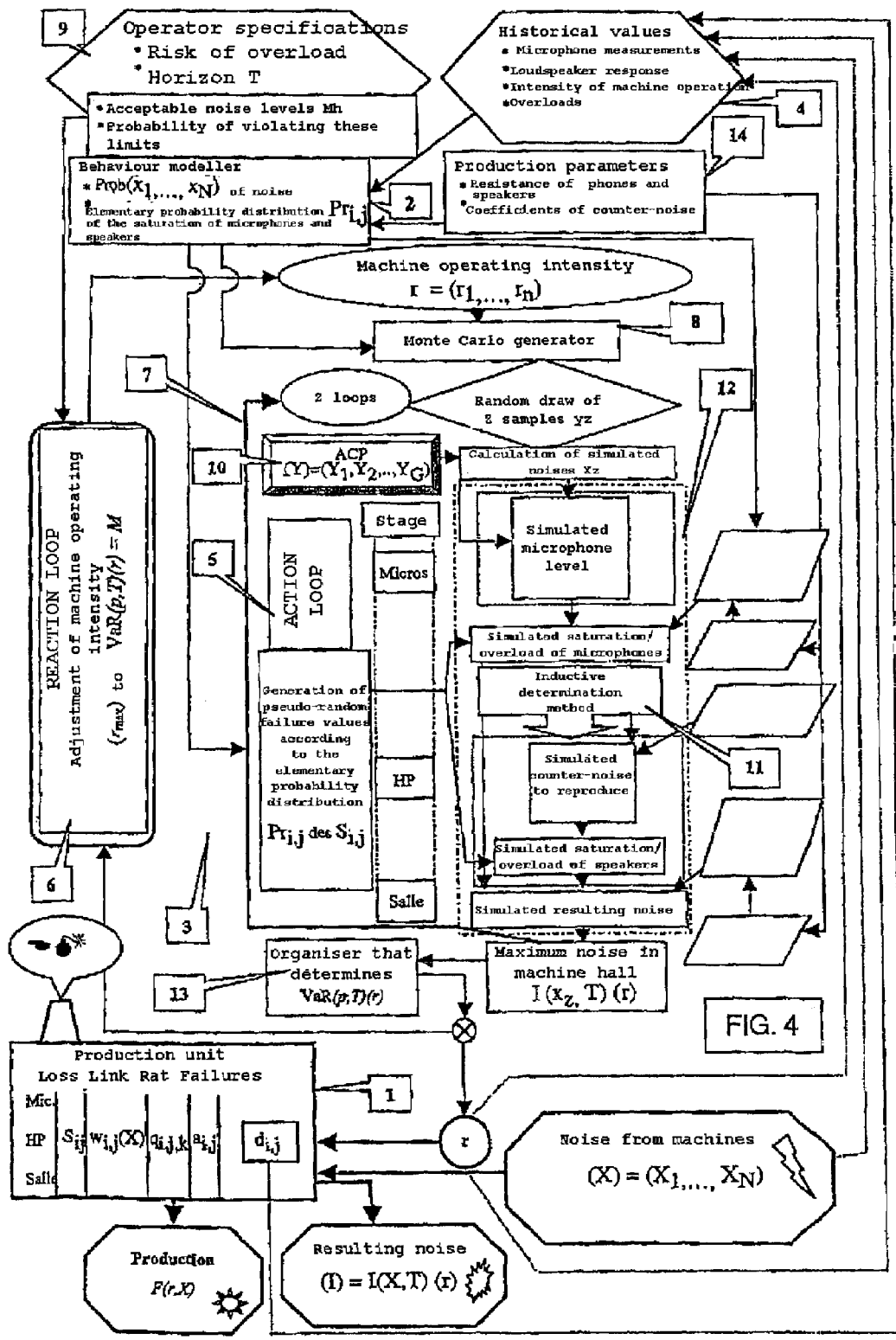
FIG. 4 shows, according to the invention, the different application stages for the process and the specifics of the production control automation in the factory and the noise reduction from FIG. 3.

The implementation of the process and the invention in this particular application consists of creating an automatic process 3 whose control conforms to FIG. 4, whose action loop 5 is a simulator of the inductive probabilistic evaluation 11 of the uncertain behaviour of:
machine noise
microphone saturation and overload
loudspeaker saturation and overload,
with a view to generate a sampling that is as true a representation as possible of the resulting noise in the machine hall. This process is characterised by that, in order to electronically generate the industrial impact (I), the noise perceived by the operators, we place an inductive probabilistic processor 12 according to the inductive method 11 for impact determination, i.e. the following stages:

With the help of a Monte-Carlo generator 8, generation by a random uncertain Monte-Carlo type draw, of the noise $W_{1,1}$ produced by the machines $S_{1,1}$ according to the user's specifications 9, and utilising, by preference, a historically adaptive behaviour modeller 2, Calculation, for each random draw, of the noise $W_{2,j}$ perceived by each microphone $S_{2,j}$ by applying the sensitivity coefficients $q_{2,i,j}$, Simulation of the failure coefficient $d_{2,j}$ for the microphone $S_{2,j}$ according to the probability distribution $Pr_{2,j}$ specifically depending on the stress $W_{2,j}$ and calculation of the picked up by the microphone $S_{2,j}$ according to he behaviour modeller 2 and the risks of overload specified by the user in the memory zone 9, called the operator specifications, Calculation of the signal transmitted to each loudspeaker $S_{2,k}$ by applying the linkage coefficients $q_{3,j,k}$ and calculation of the aggregated stress $W_{2,k}$, Simulation of the transmission coefficients $d_{3,k}$ of the loudspeakers, according to the probability distribution $Pr_{2,k}$ which depends in particular on the stress $W_{3,k}$ and calculation of the sound emitted by the loudspeaker $S_{2,k}$ according to the behaviour modeller 2 and the risks of overload specified by the user in the memory zone 9 called the operator specifications, Calculation for each uncertain draw of the theoretical noise $(I)=(I_1, \ldots, I_n)$ perceived by the operators in the hall, Determination of the VaR (13) of noise (I) as a function of the probability of violation specified by the user in the memory zone 9 called the operator specifications.

The reaction loop 6 of this control automation 3, aims to determine the maximum value $(r_{max})$ of the machine intensity function (production rate) such that the parameter VaR does not violate the prescribed value (M) also specified in the memory zone 9 called the operator specifications. This loop is completed by a servo motor acting on the machines' intensity control, and keeping this calculated value $(r_{max})$ constant.

This multi-staged calculation procedure for the final impact, which takes into account at each stage and in a separated fashion the signal exactly received by the subsystem and which it emits, allows a better estimation of the probability of violation of the authorised threshold, and, as a consequence, a reduction of the safety margins and an increase in the production flow within the given safety specifications.

The implementation of this first variant of the invented process finds its justification in the fact that the risk of saturation or overload, for the microphones as well as for the loudspeakers, is as large as the stress at the subsystems. According to this variant, the probability distribution $Pr_{i,j}$ of the transmission coefficient for the microphones and the loudspeakers is such that a larger noise perceived (microphones) or a larger signal to transmit (loudspeakers) pulls with it a level of saturation that is statistically higher, just like a more likely overload. Typically, according to this variant, we can give the the probability density $Pr_{i,j}$ on the interval [0,1] a bell shape, whose centre moves to the right when the stress grows. Such a density may for example be realised with the help of "Bernstein's polynomials", $\phi(x)=\lambda x^\alpha (1-x)^{m-\alpha}$ where the exponent $\alpha$ is an increasing function of stress.

Additionally, saturation, just like overload, can partly depend on the global quality of the microphone and the loudspeaker, but also on a "saturation threshold" belonging to each piece of apparatus (microphone or loudspeaker) beyond which the saturation phenomenon becomes systemic, justifying the application of the second variant of the invention. According to this variant, the confidence coefficient $a_{i,j}$ for the microphones and the loudspeakers possess two components. One recommended form consist of setting one of these components equal to the saturation threshold, and the other being a value assigned to the reliability of the apparatus, which can be statistically measured.

The third variant of the process of the invention is applicable when the machines have a tendency to sporadically emit important noise. In this case, the user specifies in the memory zone 9, called the operator specifications, the frequency of these "explosive pulses", and a probability distribution of their intensity according to the "disaster scenario" model. The probabilistic automatic process 3 then generates a sub-sample for the emitted noise values constituted only from the explosive pulses.

Figure 5:
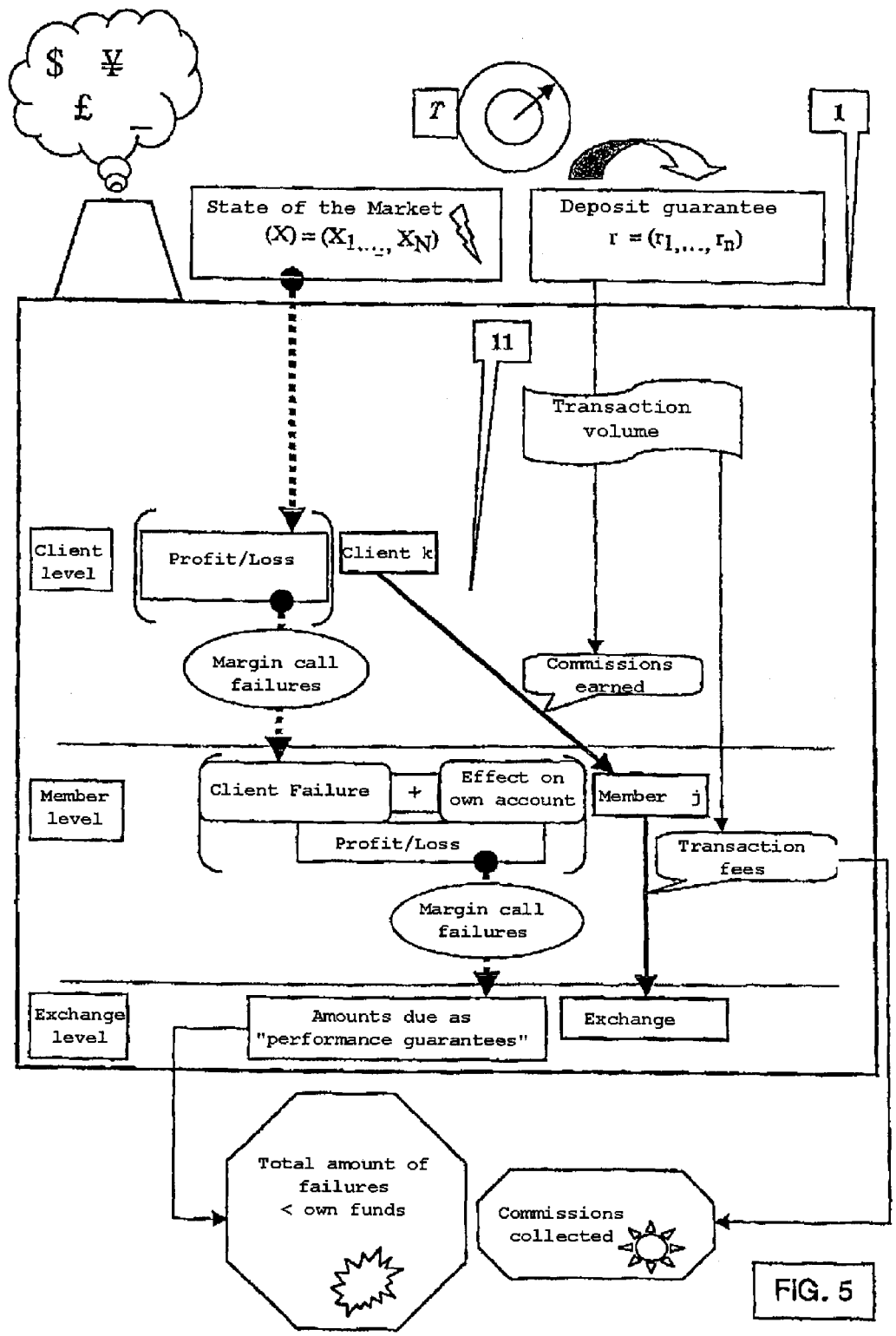
FIG. 5 shows schematically the organisation of a clearing house (exchange) to implement the process and the automatic probabilistic control according to the invention in order to maximize the transaction volume (and thus the commissions collected) while maintaining the global risk of financial loss (linked to the failure of the parties) on the right side of a regulatory limit.

FIG. 5 schematically represents the organisation of a clearing house (exchange) to implement the procedure and control automation 3 according to the invention in order to maximise the volume of transactions (and thus the brokerage fees collected) while maintaining the global risk of financial loss (linked to the failure of members) on the right side of a regulatory limit. FIG. 6 represents the different stages of the process implementation and the specifics of the control automation 3 of the invention for the clearing house in FIG. 5.

Figure 6:
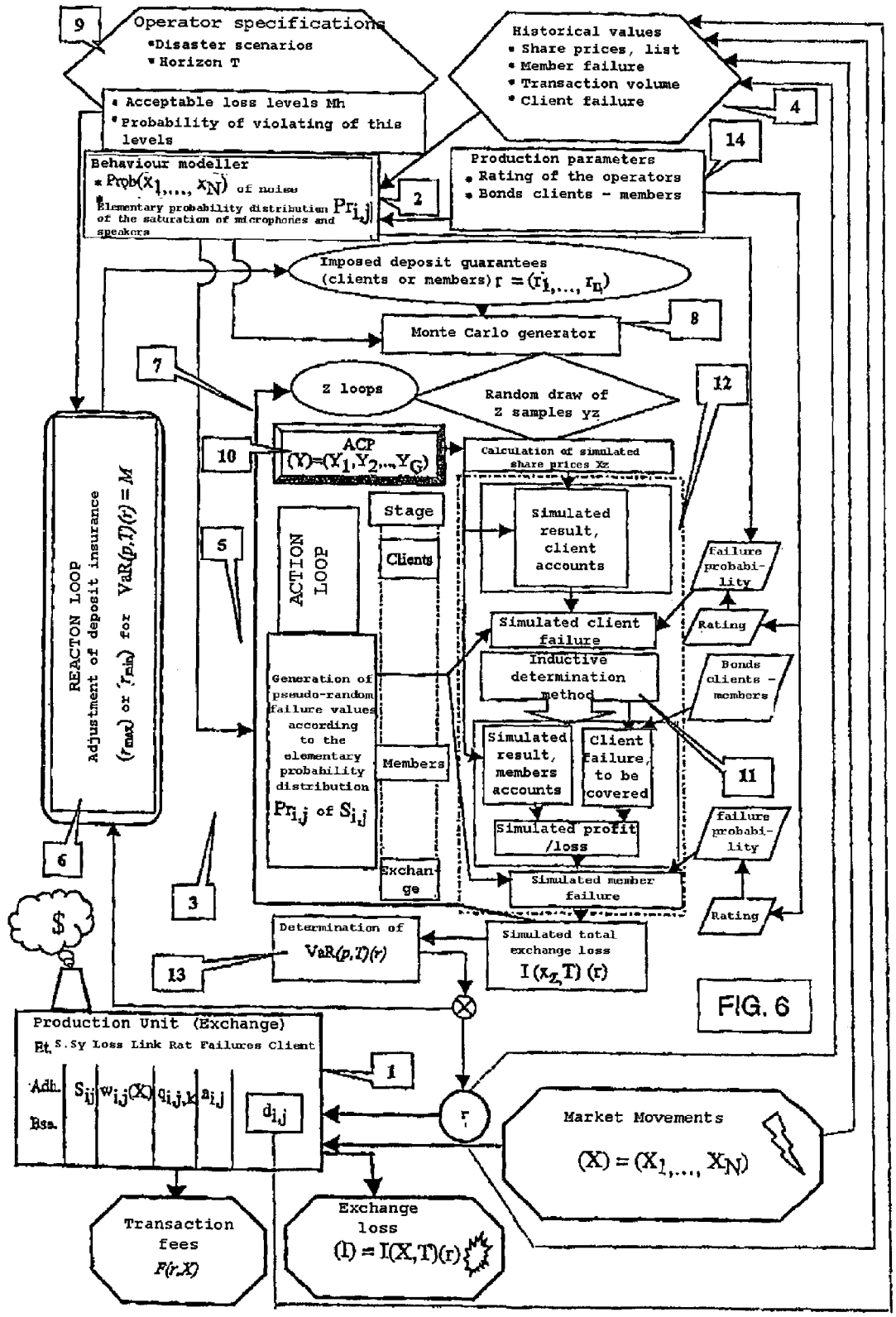
FIG. 6 shows the different stages of the process application and the specifics of the automatic probabilistic control, according to the invention, for the clearing house in FIG. 5.

The technical organisation of the electronic probabilistic automation 3 according to the invention, to be implemented at the heart of a clearing house, is described in reference to FIG. 6. The centre of the industrial production 1 is, in this application, a clearing house for financial markets, for example a stock exchange.

Let us recall that that the critical activity of a stock exchange consists of accepting stockbrokers. A trader who wishes to make a transaction must do so through a stockbroker. When he can, the stockbroker will match the operators who use his services, and will only pass on to the stock exchange the remainder (including those passes for his own account). The "clearing" which recapitulates all the day's transactions, is done each evening. In the case where on of the traders turn out to falter, that is incapable of completing his part of a transaction, the stock broker is held to completing the transaction in his place. For this performance guarantee, the stockbroker is remunerated by a brokerage commission. Additionally, the stockbroker in general requires of his clients, that is of the traders that do trades through an intermediary, a "deposited guarantee" the amount of which is a function of the transactions made.

This situation repeats almost identically between the stock exchange the different stock brokers which are affiliated with it. This last matches its members, that is the stockbrokers. In contradistinction to the stockbrokers, it is forbidden for it to place orders for itself. On the contrary, it is also held responsible for the performance of the transactions between members. The cost of this guarantee to the exchange is equal to the difference between the price at which the transaction took place and the current price at which it is possible to do the transaction. Just like the stockbrokers, the exchange bills the commissions for each transaction and requires a deposited guarantee from its members.

Because of competition between exchanges, the volume of transactions, thus the amount of transaction commissions collected by the exchange, and for the same reason, its economic efficiency is directly linked to a decrease for the deposited guarantees that it imposes on its members (stockbrokers). On the other hand, at the end of the day, the global cost of the performance guarantee (i.e. taking into account the totality of members) should only exceed certain limits $M_1, \ldots, M_H$, at frequencies $F_1, \ldots, f_H$ which are imposed by regulation. In particular, exceeding its own funds, which might pull with it the possibility of failure, should only happen with a infinitesimal probability. In order to avoid too frequent member failures, the exchange should not only require of them sufficient funds, but additionally, should impose on the brokers a minimum for them to require of their own clients.

According to the invention and in the exchange system, the multi-stage and multi-linked system is formed by the traders (clients, members) and by the exchange itself. The multi-staged structure of the global system according to the invention appears in the following form:

Stage $E_1$: The stockbrokers' clients (traders)
Stage $E_2$: The members (stockbrokers)
Stage $E_3$: The exchange (clearing house)

It is possible to imagine a structure that has more stages, if, for example, the clients themselves are in the position of "clearing" transactions for their own clients.

The productive subsystems $S_{i,j}$ of the multistage and multilinked system are the traders (clients, brokers) as well as the exchange itself.

We have here a tree structure, if we consider as distinct the multiple accounts of the same client held by different members (we no longer suppose a 100% correlation between the failure of different accounts belonging to the same client). In effect, each client is only linked to a single member and the top of the tree is composed of only a single subsystem: the exchange.

The uncertain multivariable factor (X) is the set of price variations of the different assets quoted on the exchange during the day. The impact of each of these assets on the participants (clients, members, or exchange) is equal to the product of the variation of their price and the quantity of the investments contained in the participants' portfolios.

The natural time horizon T is the day. But a control of the market movements could turn out to be necessary if, for reasons of liquidity, the portfolio of one of the participants in default cannot be liquidated in a single day.

Each transaction made for a client by a member takes place upon payment of a brokerage commission. The set of commissions paid by a client $S_{1,j}$ to a member $S_{2,k}$ represents the production subflow $F_{2,j,k}$. In the same way, each transaction made by a member of the exchange takes place upon payment of a transaction fee. The set of transaction fees paid by a member $S_{2,j}$ to the exchange $S_{3,j}$ represents the production subflow $F_3$ (there is no third index because there is only a single subsystem at stage $E_3$). The production flow F is the sum of all the subflows $F_{3,j}$, that is of all the commissions obtained by the exchange during the day.

Each asset kept in a portfolio gives rise to a deposited guarantee, which, as a general rule, is proportional to the amount of assets. The industrial action parameter (r) is the proportional relation between the amount of assets and the associated deposited guarantee. It is multivariable, because the relationship depends on the asset. The more it is raised, the more the required deposit is important, which as a consequence reduces the risk of failure, but on the other hand, also reduces the amount of transactions, that is the production flow F and the subflows $F_{i,j,k}$.

The industrial impact (I) (see §a-aaaa) is, in this application, the total amount that the exchange must forward to its members' counterparties in a failure situation under the heading "performance guarantee". It is possible to conceive of a second component of this industrial impact, which would be the same amount, reduced by the sums recovered after the liquidation of the members in default.

The aggregated stress $W_{i,j}$ (see §b-bb) of the subsystems $S_{i,j}$ is equal to the negative part of their financial results at the end of the day.

For the clients (or, if there are several layers of "clients", for the clients at the end of the chain) this result is the impact of the market movements (the uncertain multivariable factor) on their portfolio, that is the set of transactions made during the day (which can be positive or negative). In this case, the aggregated stress is the same as the "self" stress.

For the members (or for the client who do clearing for other clients) it is composed partly on this impact on their own portfolio (their "self" stress, positive or negative), partly the amount payable under the heading "performance guarantee" in case of failure of one or several clients (the transmitted stress, always negative).

For the exchange there is only the transmitted stress from members in default, because it may not have its own portfolio. The industrial impact (I) is identified as the aggregated stress $W_3$, for the unique subsystem at the third level, that is the exchange itself.

The amount of transmitted stress (see §c-ccc) can be either the totality or only a proportion of the loss suffered by the client or member. This proportion (equal to 1 if it is a total default and to 0 if there is no default) is the failure coefficient $d_{i,j}$ for the client or member.

This failure coefficient is obviously unknown. But its probability distribution $Pr_{i,j}$ moves towards higher values when the operator's loss is larger, thus justifying putting into operation the first process variant of this invention. The confidence coefficient $a_{i,j}$ of the subsystem $S_{i,j}$ carries the name "rating" of the operator. In the systems that exist as prior art, this rating is a simple property attributed to the operator. In the second variant, this invention recommends a rating that has at least two components. The first reflects the size, or, at the occurrence, the level of the funds owned by the operator $FP_{1,j}$. The second reflects his reliability, or, if you prefer, his failure probability by the ratio given between his aggregated stress $W_{1,j}$ (i.e. the loss suffered) and his own funds $FP_{1,j}$.

The third variant of the process of the invention finds its justification in the "stock market crashes" which historically only happen on the scale of several years. If the historical record of prices and failures are only go back a year, or indeed even a number of years, it is possible, even probable, that no crash has taken place during the period covered by the historical record. However, the risk calculation for the exchange should not ignore the possibility of such a catastrophic event. The normal known technique, called "stress test" consists of simulating a global downward movement, for example 20% for all the papers listed on the exchange. Certain operators have as a strategy to bet on the movement—up or down—of one stock compared to the exchange average, or compared to an exchange index. In a stress test, this stock will vary by 20%, the same as the average or the index. Such an operator would appear to have zero risk, whereas in a real crash, his real risk is actually increased because the stock, if for exampled bet to go up, might lose 30% where on average other stocks might lose only 20%. The third variant if the invention recommends a simulation of a sub-family of catastrophic situations where certain samples will make the operator's real risk clearly appear.

The implementation of the process and the invention in this particular application connected to the exchange system is described in FIG. 6. It consists of a realisation of the probabilistic control automation 3 which conforms to the general structure in FIG. 4, where the action loop 5 is an inductive probabilistic evaluation simulator 11 of the uncertain behaviour:

of the stock market prices of the operator failure (clients and members)

with a view to generating a sampling that is as true as possible to the financial amounts which the performance guarantees will cost the exchange at the end of the day.

This procedure is characterised by that, to electronically generate the industrial impact (I), in this case the financial amount, we put in place an inductive probabilistic processor 12 according to the inductive method 11 of impact determination, i.e. containing the following stages:

With the help of the Monte-Carlo generator 8, creation by a Monte-Carlo style random draw of the prices $X_i$ of the assets quoted on the exchange, while considering the catastrophic risks specified by the user in the memory zone 9 called the operator specifications, Calculation, for each random draw, of the financial result W1,I for each client S1,I following the user specifications 9 and using preferentially an adaptive historic modeller for behaviour 2, Simulation of the failure coefficients $d_{1,i}$ of the client $S_{1,i}$ according to the probability distribution $Pr_{1,i}$ specifically depending on the stress $W_{1,i}$ and the rating of the client $S_{1,I}$ according to the behaviour modeller 2, and then calculation of the amount of default for client $S_{1,I}$, Calculation, for each random draw, of the aggregated stress $W_{2,j}$ for each member $S_{2,j}$ resulting partly from the sum of the client failures that must be covered (transmitted stress), partly from "self" stress $w_{2,i,j}$ (the financial result at the end of the day), Simulation of the failure coefficient $d_{2,j}$ for the client $S_{2,j}$ according to the probability distribution $Pr_{2,j}$ depending specifically on the aggregated stress W2,j and of the member's rating, then calculation of the amount of the member's default S2,j according to the behaviour modeller 2, Calculation for each random draw of the theoretical amount (I) which the performance guarantee will cost the exchange, Determination of the VaR 13 for the impact (I) as a function of the violation probability specified, by the user, in the memory zone 9 called the operator specifications.

The reaction loop 6 for this probabilistic automation 3 control consists of determining the minimal values ($r_{1min}, \ldots, r_{Nmin}$) for the coefficients to be applied to the calculation of the required "deposited guarantees", such that the parameter VaR does not surpass the prescribed value (M) specified also in the memory zone 9 called the operator specifications. This loop is handled by an automatic procedure to adjust the required deposited guarantees.

This stepwise procedure to calculate the final impact, which takes into account, at each calculation step, the failure probability of each subsystem, allows a better estimation of the probability of violating the authorized threshold, and, as a consequence, allows a reduction in the safety margins and an increase in the production flow (the exchange's financial activity) within the given safety norms. These safety norms may include, specifically:

The "CAD" directive form the European Community published on the 15th of March 1993, about the maintenance of adequate internal funds for investment companies and credit companies, aiming to impose requirements of minimal solvency, considering the market risks linked to financial products, and the risk of change . . .

The directives from the Basle Committee, "Basle Committee on banking regulation and supervisory practices" which addresses itself to securities houses and to banks which have market activity, anticipating notably the "Amendment to the Capital Accord to Incorporate Market Risks" published in January, 1996, and requiring that each establishment pick a VaR system to understand the market risks . . . , The recommendations of the "Group of 30" bringing together world leaders in industry, banking and central banks of the whole world and recommending principles to reduce financial risks . . .

The implementation, in the exchange system, of the first variant of the process finds its justification in the fact that the failure risk, for the clients as well as for the members, is as high as the stress levels of the sub-systems. According to this variant, the probability distribution $Pr_{i,j}$ for the clients' and members' failure coefficients is such that a financial loss (clients) or, a higher global amount to cover—failures+loss (members), pulls with it a higher statistical failure probability. Typically, according to this variant, the probability density $Pr_{i,j}$ can be assembled from a probability $1-p_{i,j}$ for zero value and a uniform distribution over the interval [0,1] of the total weight $p_{i,j}$, where the failure probability $p_{i,j}$ is an increasing function of the aggregated stress $W_{i,j}$.

Additionally, the failure of clients and members can partly depend on the global reliability of the operator, but also on a "failure threshold" specific to each operator (client or member) beyond which the failure becomes almost inevitable, thus justifying the implementation of the second variant of the process invention. According to this variant, the clients' and members' confidence coefficients $a_{i,j}$ have two components. One recommended form consists of setting one of the components equal to the amount of own funds, and the other a value describing the reliability of the operator, which can be obtained from specialised rating agencies.

The implementation of the third variant of the process is justified by abrupt movements of the prices—rising or falling—which appear from time to time. When the user specifies in the memory zone 9 called operator specification, the frequency of these "catastrophic movements" and a probability distribution of their intensity on the pattern of "catastrophic scenarios". The automat then generates a sub-sample of values of their prices uniquely constituted of catastrophic scenarios.

As the invention has been described, and its interest and applicability justified by the detailed examples, the claimants reserve to themselves exclusivity during the length of the patent, without limitations other than those in the patent claims below.

The invention claimed is:

1. A computer readable medium storing computer program code, for simulating the behavior of a system to thereby control said system, said system having productive subsystems ($S_{i,j}$), operating along a succession of operative phases ($E_1, \ldots, E_m$), the subsystems being interlinked and regulated by an industrial action parameter (r), and said subsystems also being affected by respective self-stresses ($W_{i,j}(x_z)$) and further being constrained to operate according to a set of criteria based on said aggregated stress, said computer program code, when executed by at least one processor, causing the at least one processor to perform the steps of:

a) determining an aggregated stress ($W_{i,j}$) at a current productive subsystem ($S_{i,j}$), said aggregated stress being determined from estimates of the level of self stress ($W_{i,j}(x_z)$) for productive subsystems at the current operative phase, and from transferred stress from productive subsystems at a preceding operative phase;

b) determining an impact parameter ($I_h(x_z, T)(r)$) for the current operative phase, the determination being based on the aggregated stress ($W_{i,j}$) of the productive subsystems of said current operative phase, said impact parameter representing the likelihood that the behaviour of the respective productive subsystem under the aggregated stress will no longer comply with the set of criteria, thus transmitting stress to a subsequent operative phase;

c) repetitively operating the step a) and the step b) for all operative phases, with said transferred stress being each time affected by a pseudo-random component;

d) repetitively operating the step c), each time with new pseudo-random components;

e) building a failure probability distribution ($Pr_{i,j}(x_z,T,r,W_{z,i,j},a_{i,j})$) for the productive subsystems ($S_{i,j}$) using the repetitions operated by said the step d); and f) adjusting the industrial action parameter (r), based on said failure probability distribution ($Pr_{i,j}(x_z,T,r,W_{z,i,j},a_{i,j})$);

wherein the step a) determines the aggregated stress ($W_{i,j}$) for each of the productive subsystem ($S_{i,j}$) using following formula:

$$W_{i,j} = W_{i,j,self} + \Sigma_k W'_{i,j,k} = W_{i,j,self} + \Sigma_k W_{i,j,k} * d_{i,i-1,j} * q_{i,j,k}$$

wherein:

$W_{i,j,self}$ are estimates of the level of self stress for a given subsystem ($S_{i,j}$), $\Sigma_k W'_{i,j,k}$ is the sum of transmitted stress between subsystems ($S_{i,j}$), $W_{i,j,k}$ are the stress of preceding subsystems ($S_{i-1,k}$) that are transmitted to ($S_{i,j}$), $d_{i,i-1}$ are transmission coefficients between the subsystems ($S_{i-1,k}$) and ($S_{i,j}$), and $q_{i,j,k}$ are predetermined linkage coefficients between two successive subsystems ($S_{i-1,k}$) and ($S_{i,j}$).

2. A method performed by execution of computer readable program code by at least one processor of at least one computer system, for simulating the behavior of a system to thereby control said system, said system having productive subsystems ($S_{i,j}$) and operating along a succession of operative phases ($E_1, \ldots, E_m$), the subsystems being interlinked and regulated by an industrial action parameter (r), and said subsystems also being affected by respective self-stresses ($W_{i,j}(x_z)$) and further being constrained to operate according to a set of criteria based on said aggregated stress, the method, when executed by the at least one processor, comprising the steps of:

a) determining, using at least one of the processors, an aggregated stress ($W_{i,j}$) at a current productive subsystem ($S_{i,j}$), said aggregated stress being determined from estimates of the level of self stress ($W_{i,j}(x_z)$) for productive subsystems at the current operative phase, and from transferred stress from productive subsystems at a preceding operative phase, the transferred stress being affected by a pseudo-random component;

b) determining, using at least one of the processors, an impact parameter ($I_h(x_z, T)(r)$) for the current operative phase, the determination being based on the aggregated stress ($W_{i,j}$) of the productive subsystems of said current operative phase, said impact parameter representing the likelihood that the behavior of the respective productive subsystem under the aggregated stress will no longer comply with the set of criteria, thus transmitting stress to a subsequent operative phase;

c) repeating, using at least one of the processors, the step a) through the step b) up to a final operative phase;

d) repeating, using at least one of the processors, the step c) for a selected number of times, each time with new pseudo-random components at the step a);

e) building, using at least one of the processors, a probability distribution ($Pr_{i,j}(x_z,T,r,W_{z,i,j},a_{i,j})$) for the productive subsystems ($S_{i,j}$) using the repetitions at step d), and f) adjusting, using at least one of the processors, the industrial action parameter (r), based on said failure probability distribution ($Pr_{i,j}(x_z,T,r,W_{z,i,j},a_{i,j})$), wherein the determination of the aggregated stress ($W_{i,j}$) for each of the productive subsystem ($S_{i,j}$) uses following formula:

$$W_{i,j} = W_{i,j,self} + \Sigma_k W'_{i,j,k} = W_{i,j,self} + \Sigma_k W_{i,j,k} * d_{i,i-1,j} * q_{i,j,k}$$

wherein:

$W_{i,j,self}$ are estimates of the level of self stress for a given subsystem ($S_{i,j}$), $\Sigma_k W'_{i,j,k}$ is the sum of transmitted stress between subsystems ($S_{i,j}$), $W_{i,j,k}$ are the stress of preceding subsystems ($S_{i-1,k}$) that are transmitted to ($S_{i,j}$), $d_{i,i-1}$ are transmission coefficients between the subsystems ($S_{i-1,k}$) and ($S_{i,j}$), and $q_{i,j,k}$ are predetermined linkage coefficients between two successive subsystems ($S_{i-1,k}$) and ($S_{i,j}$).

3. A method performed by execution of computer readable program code by at least one processor of at least one computer system, for regulating a production flow of an industrial process performed in an industrial facility by determining an industrial impact resulting from an uncertain chained stress at different production steps in the production flow, the production flow including multi-stage and multi-linked production steps $E_1, \ldots, E_m$, wherein each of the production steps $E_i$ is composed of productive subsystems $S_{i,j}$, the method, when executed by the at least one processor, comprising:

a) electronically generating, using at least one of the processors, elementary impact components $I(x_z,T)(r)$ corresponding to each sample of an uncertain quantity $x_z$, wherein T corresponds to a time period during which the production flow operates, and (r) corresponds to an industrial action parameter, b) making an electronic determination, using at least one of the processors, for each sample of the uncertain quantity $x_z$, and as a function of the industrial action parameter (r), a level of aggregated stress $W_{z,i,j}$ for each of the productive subsystems $S_{i,j}$ by an inductive method, starting at the first step $E_1$ and ending at the last step $E_m$, in which:

b1) measuring, using at least one of the processors, starting from the first step $E_1$, a level of self stress $W_{1,j}(x_z)$ for each of the productive subsystems $S_{1,j}$ at the first step $E_1$, b2) determining, using at least one of the processors, only for the first step $E_1$ under consideration, the level of self stress $W_{1,j}(x_z)$ for each of the productive subsystems $S_{1,j}$ with the aggregated stress $W_{z,1,j}$, b3) electronically performing, using at least one of the processors, a pseudorandom computation of a transmission coefficient $d_{z,1,j}$ for each of the productive subsystems $S_{1,j}$ at the first step $E_1$, using a probability distribution for elementary failures, $Pr_{1,j}(x_z,T,r,W_{z,1,j},a_{1,j})$ for the productive subsystems $S_{1,j}$, in which a pseudo-random number $u_{z,1,j}$ in the interval [0,1] is electronically generated, and in which the pseudorandom number $u_{z,1,j}$ is electronically applied to an inverse distribution function $\Phi_{1,j}(x_z,T,r,W_{z,1,j},a_{1,j})(u_{z,1,j})$, thereby obtaining a probability of elementary failure $Pr_{i,j}(x_z,T,r,W_{z,1,j},a_{1,j})$ for the productive subsystems $S_{1,j}$, b4) determining, using at least one of the processors, the level of the self stress $W_{2,k}(x_z)$ for each of the productive subsystems $S_{2,k}$ at the second step $E_2$, b5) electronically evaluating, using at least one of the processors, the aggregated stress for each of the productive subsystems $S_{2,k}$ at the second step $E_2$ using the formula:

$$W_{z,2,k} = W_{2,k}(s_z) + \Sigma_j W'_{z,2,j,k} = W_{2,k}(x_z) + \Sigma_j W_{2,1,j}(x_z) * d_{2,1,j} * q_{2,j,k},$$

wherein $q_{2,j,k}$ corresponds to linkage coefficients that are predetermined for the second step of the production flow, b6) repeating, using at least one of the processors, the operations b1) through (b5 for the third step $E_3$ to the last step $E_m$ to obtain the aggregated stress for each of the steps $E_1$ through $E_m$, c) determining, using at least one of the processors, a multivariable industrial impact parameter $I(x_z,T)$ linked to a sample with index z in such a manner that the sample with index z is a Monte-Carlo sample which constitutes the uncertain quantity $x_z$ and the transmission coefficient $d_{z,j,j}$:

c1) measuring, using at least one of the processors, an industrial impact variable I while computing the aggregated stress $W_{z,i,j}$ at each production step $E_1$ through $E_m$ and while computing the transmission coefficients $d_{z,i,j}$ at each production step $E_1$ through $E_m$, and c2) obtaining, using at least one of the processors, from the measured industrial impact variable I, a measurement of a probability of violating a predetermined regulation level given by a supplied value V by an impact I(r) on the production flow, d) regulating the industrial process through setting an effective violation frequency for authorized limits for the impact I(r) at or near target values based on the measurement of the probability of violating the predetermined regulation level, e) increasing production flow by reducing industrial safety margins to be applied at a resistance level M in the industrial facility while still adhering to regulations imposed on the production flow, and f) improving efficiency of operation in the industrial facility as a result of increasing the production and reducing the industrial safety margins.

4. The method according to claim 3, wherein the uncertain quantity $x_z$ corresponds to noise produced by one or more machines that perform the production flow.

5. The method according to claim 4, wherein the industrial impact parameter (r) corresponds to a production rate of the one or more machines.

6. The method according to claim 4, wherein the productive subsystems correspond to machines, microphones and loudspeakers.

7. A method performed by execution of computer readable program code by at least one processor of at least one computer system, for regulating a operation flow of an industrial process performed in an industrial facility by determining an impact resulting from an uncertain chained stress at different operation steps in the operation flow, the operation flow including multi-stage and multi-linked operation steps $E_1, \ldots, E_m$, wherein each of the operation steps $E_i$ is composed of operation subsystems $S_{i,j}$, the method, when executed by the at least processor, comprising:

a) electronically generating using at least one of the processors, elementary impact components $I(x_z,T)(r)$ corresponding to each sample of an uncertain quantity $x_z$, wherein T corresponds to a time period during which the operation flow operates, and (r) corresponds to an action parameter, b) making an electronic determination, using at least one of the processors, for each sample of the uncertain quantity $x_z$, and as a function of the action parameter (r), a level of aggregated stress $W_{z,j,j}$ for each of the operation subsystems $S_{i,j}$ by an inductive method, starting at the first step $E_1$ and ending at the last step $E_m$, in which:

b1) measuring, using at least one of the processors, starting from the first step $E_1$, a level of self stress $W_{1,j}(x_z)$ for each of the operation subsystems $S_{i,j}$ at the first step $E_1$, b2) determining, using at least one of the processors, only for the first step $E_1$ under consideration, the level of self stress $W_{1,j}(x_z)$ for each of the operation subsystems $S_{1,j}$ with the aggregated stress $W_{z,1,j}$, b3) electronically performing, using at least one of the processors, a pseudorandom computation of a transmission coefficient $d_{z,1,j}$ for each of the operation subsystems $S_{1,j}$ at the first step $E_1$, using a probability distribution for elementary failures, $Pr_{1,j}(x_z,T,r,W_{z,1,j},a_{1,j})$ for the operation subsystems $S_{1,j}$, in which a pseudorandom number $u_{z,1,j}$ in the interval [0,1] is electronically generated, and in which the pseudorandom number $u_{z,1,j}$ is electronically applied to an inverse distribution function $\Phi_{1,j}(x_z,T,r,W_{z,1,j},a_{1,j})$ $(u_{z,1,j})$, thereby obtaining a probability of elementary failure $Pr_{i,j}(x_z,T,r,W_{z,1,j},a_{1,j})$ for the operation subsystems $S_{1,j}$, b4) determining, using at least one of the processors, the level of the self stress $W_{2,k}(x_z)$ for each of the operation subsystems $S_{2,k}$ at the second step $E_2$, b5) electronically evaluating, using at least one of the processors, the aggregated stress for each of the operation subsystems $S_{2,k}$ at the second step $E_2$ using the formula:

$$W_{z,2,k} = W_{2,k}(s_z) + \Sigma_j W'_{z,2,j,k} = W_{2,k}(x_z) + \Sigma_j W_{2,1,j}(x_z) * d_{2,1,j} * q_{2,j,k},$$

wherein $q_{2,j,k}$ corresponds to linkage coefficients that are predetermined for the second step of the operation flow, b6) repeating, using at least one of the processors, the operations b1) through (b5 for the third step $E_3$ to the last step $E_m$ to obtain the aggregated stress for each of the steps $E_1$ through $E_m$, c) determining, using at least one of the processors, a multivariable industrial impact parameter $I(x_z,T)$ linked to a sample with index z in such a manner that the sample with index z is a Monte-Carlo sample which constitutes the uncertain quantity $x_z$ and the transmission coefficient $d_{z,j,j}$:

c1) measuring, using at least one of the processors, an impact variable I while computing the aggregated stress $W_{z,i,j}$ at each operation step $E_1$ through $E_m$ and while computing the transmission coefficients $d_{z,i,j}$ at each operation step $E_1$ through $E_m$, and c2) obtaining, using at least one of the processors, from the measured impact variable I, a measurement of a probability of violating a predetermined regulation level given by a supplied value V by an impact I(r) on the operation flow, d) regulating the industrial process through setting an effective violation frequency for authorized limits for the impact I(r) at or near target values based on the measurement of the probability of violating the predetermined regulation level, e) increasing production flow by reducing industrial safety margins to be applied at a resistance level M in the industrial facility, while still adhering to regulations imposed on the operation flow, and f) improving efficiency of operation in the industrial facility as a result of increasing the production and reducing the industrial safety margins.

8. A computer readable medium storing computer program code, for regulating a production flow of an industrial process performed in an industrial facility by determining an industrial impact resulting from an uncertain chained stress at different production steps in the production flow, the production flow including multi-stage and multi-linked production steps $E_1, \ldots, E_m$, wherein each of the production steps $E_i$ is composed of productive subsystems $S_{i,j}$, the computer program code, when executed by at least one processor, causing the at least one processor to perform the steps of:

a) electronically generating elementary impact components $I(x_z,T)(r)$ corresponding to each sample of an uncertain quantity $x_z$, wherein T corresponds to a time period during which the production flow operates, and (r) corresponds to an industrial action parameter, b) making an electronic determination, for each sample of the uncertain quantity $x_z$, and as a function of the industrial action parameter (r), a level of aggregated stress $W_{z,j,j}$ for each of the productive subsystems $S_{i,j}$ by an inductive method, starting at the first step $E_1$ and ending at the last step $E_m$, wherein step b) comprises:

b1) measuring, starting from the first step $E_1$, a level of self stress $W_{1,j}(x_z)$ for each of the productive subsystems $S_{1,j}$ at the first step $E_1$, b2) determining, only for the first step $E_1$ under consideration, the level of self stress $W_{1,j}(x_z)$ for each of the productive subsystems $S_{1,j}$ with the aggregated stress $W_{z,1,j}$, b3) electronically performing a pseudorandom computation of a transmission coefficient $d_{z,1,j}$ for each of the productive subsystems $S_{1,j}$ at the first step $E_1$, using a probability distribution for elementary failures, $Pr_{1,j}(x_z,T,r,W_{z,1,j},a_{1,j})$ for the productive subsystems $S_{1,j}$, in which a pseudorandom number $u_{z,1,j}$ in the interval [0,1] is electronically generated, and in which the pseudorandom number $u_{z,1,j}$ is electronically applied to an inverse distribution function $\Phi_{1,j}(x_z,T,r,W_{z,1,j},a_{1,j})$ $(u_{z,1,j})$, thereby obtaining a probability of elementary failure $Pr_{i,j}(x_z,T,r,W_{z,1,j},a_{1,j})$ for the productive subsystems $S_{1,j}$, b4) determining the level of the self stress $W_{2,k}(x_z)$ for each of the productive subsystems $S_{2,k}$ at the second step $E_2$, b5) electronically evaluating the aggregated stress for each of the productive subsystems $S_{2,k}$ at the second step $E_2$ using the formula:

$$W_{z,2,k}=W_{2,k}(s_z)+\Sigma_j W'_{z,2,j,k}=W_{2,k}(x_z)+\Sigma_j W_{2,1,j}(x_z)*d_{2,1,j}*q_{2,j,k},$$

wherein $q_{2,j,k}$ corresponds to linkage coefficients that are predetermined for the second step of the production flow, b6) repeating the operations b1) through (b5 for the third step $E_3$ to the last step $E_m$ to obtain the aggregated stress for each of the steps $E_1$ through $E_m$, c) determining a multivariable industrial impact parameter $I(x_z,T)$ linked to a sample with index z in such a manner that the sample with index z is a Monte-Carlo sample which constitutes the uncertain quantity $x_z$ and the transmission coefficient $d_{z,j,j}$:

c1) an industrial impact variable I is measured while computing the aggregated stress $W_{z,i,j}$ at each production step $E_1$ through $E_m$ and while computing the transmission coefficients $d_{z,i,j}$ at each production step $E_1$ through $E_m$, and c2) from the measured industrial impact variable I, a measurement of a probability of violating a predetermined regulation level given by a supplied value V by an impact I(r) on the production flow is obtained, d) regulating the industrial process through setting an effective violation frequency for authorized limits for the impact I(r) at or near target values based on the measurement of the probability of violating the predetermined regulation level, e) increasing production flow by reducing industrial safety margins to be applied at a resistance level M in the industrial facility, while still adhering to regulations imposed on the production flow, and f) improving efficiency of operation in the industrial facility as a result of increasing the production and reducing the industrial safety margins.

* * * * *

UNITED STATES PATENT AND TRADEMARK OFFICE
CERTIFICATE OF CORRECTION

PATENT NO. : 7,644,005 B1
APPLICATION NO. : 10/149960
DATED : January 5, 2010
INVENTOR(S) : Jean-Marie Billiotte et al.

Page 1 of 1

It is certified that error appears in the above-identified patent and that said Letters Patent is hereby corrected as shown below:

Title Page, Item (54) and at Column 1, lines 1-6,

The title should read as follows:

-- PROCESS AND AUTOMATION OF AN INDUSTRIAL PROCESS IN STEPS, WITH MASTERY OF AN UNCERTAIN STRESS CHAIN, AND ITS APPLICATION FOR CONTROL OF NOISE AND OF THE RISK (VALUE-A-RISK, VAR) OF A CLEARING HOUSE --

Signed and Sealed this

Thirtieth Day of March, 2010

David J. Kappos
*Director of the United States Patent and Trademark Office*